United States Patent
Gage et al.

(10) Patent No.: US 11,807,780 B2
(45) Date of Patent: Nov. 7, 2023

(54) AQUEOUS COATINGS CONTAINING BIOSURFACTANTS AS BIO-ADJUVANTS AND METHODS FOR USING SAME

(71) Applicant: RHODIA OPERATIONS, Paris (FR)

(72) Inventors: Laura Gage, Lawrenceville, NJ (US); Denis Bendejacq, Philadelphia, PA (US); Homayoun Jamasbi, Lansdale, PA (US)

(73) Assignee: RHODIA OPERATIONS, Paris (FR)

( * ) Notice: Subject to any disclaimer, the term of this patent is extended or adjusted under 35 U.S.C. 154(b) by 1041 days.

(21) Appl. No.: 16/671,971

(22) Filed: Nov. 1, 2019

(65) Prior Publication Data
US 2020/0140694 A1    May 7, 2020

Related U.S. Application Data

(60) Provisional application No. 62/755,738, filed on Nov. 5, 2018.

(51) Int. Cl.
| | | |
|---|---|---|
| *C09D 5/02* | (2006.01) | |
| *C08F 2/00* | (2006.01) | |

(Continued)

(52) U.S. Cl.
CPC ............ *C09D 5/025* (2013.01); *C08F 2/001* (2013.01); *C08F 2/24* (2013.01); *C08F 2/44* (2013.01); *C08F 212/08* (2013.01); *C08F 214/06* (2013.01); *C08F 218/08* (2013.01); *C08F 220/06* (2013.01); *C08F 220/18* (2013.01); *C08F 220/44* (2013.01); *C08K 3/013* (2018.01); *C08K 3/22* (2013.01); *C08K 3/26* (2013.01);

(Continued)

(58) Field of Classification Search
CPC ..................................................... C09D 5/025
See application file for complete search history.

(56) References Cited

U.S. PATENT DOCUMENTS

| 5,373,016 A | 12/1994 | Brown et al. |
|---|---|---|
| 7,348,382 B2 | 3/2008 | Ueno et al. |

(Continued)

FOREIGN PATENT DOCUMENTS

| BE | 1005825 A4 | 2/2014 |
|---|---|---|
| CN | 107513324 A | 12/2017 |

(Continued)

OTHER PUBLICATIONS

Rhamnolipid Biosurfactant, U.S. Environmental Protection Agency, Mar. 23, 2004. (Year: 2004).*

(Continued)

*Primary Examiner* — Michael F Pepitone
(74) *Attorney, Agent, or Firm* — Vorys, Sater Seymour and Pease LLP; Anthony P. Venturino; Maryellen Feehery Hank

(57) ABSTRACT

Disclosed is an aqueous coating composition including at least one latex polymer derived from at least one monomer copolymerized or blended with a rhamnolipid and/or sophorolipid biosurfactant, which in one embodiment is a mono-rhamnolipid. Also provided is an aqueous architectural coating composition including at least one latex polymer derived from at least one monomer copolymerized or blended with a biosurfactant, at least one pigment, and water.

44 Claims, 6 Drawing Sheets
(3 of 6 Drawing Sheet(s) Filed in Color)

(51) Int. Cl.

| | |
|---|---|
| C08F 2/44 | (2006.01) |
| C08F 220/06 | (2006.01) |
| C08F 220/18 | (2006.01) |
| C08F 212/08 | (2006.01) |
| C08F 214/06 | (2006.01) |
| C08F 218/08 | (2006.01) |
| C08F 220/44 | (2006.01) |
| C08K 5/00 | (2006.01) |
| C08K 5/46 | (2006.01) |
| C08K 5/134 | (2006.01) |
| C08K 5/103 | (2006.01) |
| C08K 3/013 | (2018.01) |
| C08K 3/22 | (2006.01) |
| C08K 3/26 | (2006.01) |
| C08K 3/34 | (2006.01) |
| C08K 3/36 | (2006.01) |
| C08F 2/24 | (2006.01) |

(52) U.S. Cl.
CPC ............... *C08K 3/346* (2013.01); *C08K 3/36* (2013.01); *C08K 5/0058* (2013.01); *C08K 5/103* (2013.01); *C08K 5/134* (2013.01); *C08K 5/46* (2013.01); *C08K 2003/2227* (2013.01); *C08K 2003/2241* (2013.01); *C08K 2003/265* (2013.01)

(56) References Cited

U.S. PATENT DOCUMENTS

| | | |
|---|---|---|
| 2002/0014178 A1 | 2/2002 | Haught et al. |
| 2011/0237531 A1 | 9/2011 | Yanagisawa et al. |
| 2011/0270207 A1 | 11/2011 | DeSanto |
| 2013/0296461 A1 | 11/2013 | Sadasivan |

FOREIGN PATENT DOCUMENTS

| | | |
|---|---|---|
| JP | 2003012426 A | 1/2003 |
| KR | 20100101589 A | 9/2010 |
| KR | 20160075635 A | 6/2016 |

OTHER PUBLICATIONS

Haba, E., et al., Physicochemical Characterization and Antimicrobial Properties of Rhamnolipids Produced by Pseudomonas aeruginosa 47T2 NCBIM 40044, Biotechnology and Bioengineering, vol. 81, No. 3, Feb. 5, 2003, pp. 316-322.

Pohlein, G., Emulsion Polymerization, Encyclopedia of Polymer Science and Engineering, vol. 6, pp. 1-51 (John Wiley & Sons, Inc., NY, NY, 1986).

Sarac, A.S., Redox oolymerization, Progress in Polymer Science 24 (1999), pp. 1149-1204.

Pattanathu, Production, Characterisation and Applications of Biosurfactants—Review, Biotechnology 7 (2): 360-370, ISSN 1682-296X (2008) Asian Network for Scientific information.

* cited by examiner

AQUEOUS COATINGS CONTAINING BIOSURFACTANTS AS BIO-ADJUVANTS AND METHODS FOR USING SAME

CROSS REFERENCE TO RELATED APPLICATIONS

This application claims the benefit of U.S. Provisional Application No. 62/755,738 filed Nov. 5, 2018, incorporated herein by reference in its entirety.

FIELD OF THE INVENTION

The present invention relates to compositions incorporating and methods using biosurfactants for architectural coatings, for example paints. In particular, the present invention relates to using biosurfactants as emulsifiers in emulsion polymerization for making aqueous latex dispersions, aqueous latex coatings, aqueous latex binders and aqueous latex paints. Also, the present invention relates to using biosurfactants as additives and/or adjuvants for aqueous latex dispersions, aqueous latex coatings, aqueous latex binders and aqueous latex paints. The biosurfactants typically comprise rhamnolipids or sophorolipids.

BACKGROUND OF THE INVENTION

Paint is any liquid, liquefiable, or mastic composition which, after application to a substrate in a thin layer, is converted to a solid film. It is most commonly used to protect, color or provide texture to objects. Paint contains a binder (also known as a vehicle or resin), a diluent or solvent, a pigment or filler, and may also have other additives. The binder, commonly called the vehicle, is the film-forming component of paint. It is the only component that must be present. Components listed below are included optionally, depending on the desired properties of the cured film.

The binder imparts adhesion and strongly influences such properties as gloss, durability, flexibility, and toughness. In latex paint the binder comprises latex.

Latex is a stable dispersion (colloidal emulsion) of polymer microparticles in an aqueous medium. Thus, it is a suspension/dispersion of rubber or plastic polymer microparticles in water. Latexes may be natural or synthetic. Polymerization is a preferred technology used to make emulsion polymers and polymer latexes.

Latex paint is a water-borne dispersion of sub-micrometer polymer particles. The term "latex" in the context of paint simply means an aqueous dispersion; latex rubber (the sap of the rubber tree that has historically been called latex) is not an ingredient. The use of latex, produced by emulsion polymerization, in the production of paints or coatings for substrates is well known in the art.

Latex paints are used for a variety of applications including interior and exterior, and flat, semi-gloss and gloss applications. Latex paints cure by a process called coalescence where first the water, and then the trace, or coalescing, solvent, evaporate and draw together and soften the latex binder particles and fuse them together into irreversibly bound networked structures, so that the paint will not redissolve in the solvent/water that originally carried it. This is a characteristic of paints which distinguishes from, for example, aqueous desktop inkjet printer inks. However, such paints or coatings are adversely affected by the presence of emulsifiers required in the emulsion polymerization process. Furthermore, in latex polymerization, surfactants are necessary to provide stable monomer pre-emulsion, stability during the polymerization, and overall stability of the final latex. The residual surfactants in paint as well as hydrolytic effects with some polymers may cause the paint to remain susceptible to softening and, over time, degradation by water.

The main purposes of the diluent are to dissolve the polymer and adjust the viscosity of the paint. It is volatile and does not become part of the paint film. It also controls flow and application properties, and in some cases can affect the stability of the paint while in liquid state. Its main function is as the carrier for the non-volatile components. To spread heavier oils (for example, linseed) as in oil-based interior house paint, a thinner oil is required. These volatile substances impart their properties temporarily—once the solvent has evaporated, the remaining paint is fixed to the surface. This component is optional: some paints have no diluent. Water is the main diluent for water-borne paints, even the co-solvent types. Solvent-borne, also called oil-based, paints can have various combinations of organic solvents as the diluent, including aliphatics, aromatics, alcohols, ketones and white spirit. Specific examples are organic solvents such as petroleum distillate, esters, glycol ethers, and the like. Sometimes volatile low-molecular weight synthetic resins also serve as diluents.

Pigments are granular solids incorporated in the paint to contribute color. Fillers are granular solids incorporate to impart toughness, texture, give the paint special properties, or to reduce the cost of the paint. Alternatively, some paints contain dyes instead of or in combination with pigments. Pigments can be classified as either natural or synthetic types. Natural pigments include various clays, calcium carbonate, mica, silicas, and talcs. Synthetics would include engineered molecules, calcined clays, blanc fixe, precipitated calcium carbonate, and synthetic pyrogenic silicas. Hiding pigments, in making paint opaque, also protect the substrate from the harmful effects of ultraviolet light. Hiding pigments include titanium dioxide, phthalo blue, red iron oxide, and many others. Fillers are a special type of pigment that serve to thicken the film, support its structure and increase the volume of the paint. Fillers are usually cheap and inert materials, such as diatomaceous earth, talc, lime, barytes, clay, etc. Floor paints that will be subjected to abrasion may contain fine quartz sand as filler. Not all paints include fillers. On the other hand, some paints contain large proportions of pigment/filler and binder.

Besides the three main categories of ingredients, paint can have a wide variety of miscellaneous additives, which are usually added in small amounts, yet provide a significant effect on the product. Some examples include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, and the like. Additives normally do not significantly alter the percentages of individual components in a formulation. Surfactants are key ingredients of many formulations in various applications.

In the paints and coatings additives market, surfactants and biocides are important components in a formulation for various reasons. Surfactants are used as wetting, anti-foaming and dispersing agents. Biocides are used for controlling microbes from spoilage and protect dry films from mildew growth.

Biocides and mildewcides are two classes of antimicrobial agents used in a can of paint for two main goals. Biocides, also known as in-can preservatives, are used to preserve wet paints from spoilage due to bacterial growth whereas mildewcides are used to protect dry films from fungal deteriorations. Biocides belonging to different classes of chemistries such as formaldehyde releasers, isothiazolinones, carbamates and thiols are used for their various properties. Some of the chemistries are either listed as carcinogens or are corrosive and sensitizers.

Because of the flooding and building damages due to typhoons, hurricanes, floods, and other similar national disasters, dry film fungicides or mildewcides usage has increased. However, in some instances interior paints in homes for basements, bathrooms and kitchens, in hotel rooms, school buildings and hospital environments are being formulated with mildewcides that are not environmentally friendly or have issues of handling safety and causing sensitizing reactions.

Surfactants can be classified according to the nature of the charge on individual polar moiety. Anionic surfactants are negatively charged usually due to a sulphonate or sulphur group. Non-ionic surfactants lack ionic constituent and the majority of all non-ionics are polymerization products of 1, 2-epoxyethane. Cationic surfactants are characterized by a quaternary ammonium group which is positively charged. Lastly, amphoteric surfactants have both positively and negatively charged moieties in the same molecule. Biosurfactants can also be grouped into two categories namely, (1) low-molecular-mass molecules with lower surface and interfacial tensions and (2) high-molecular-mass polymers which bind tightly to surfaces. Examples of low-molecular-mass molecules are rhamnolipids and sophorolipids. Examples of high molecular-mass polymers are food emulsifiers and biodispersants.

SUMMARY OF THE INVENTION

The present invention uses biosurfactants (including but not limited to mono-rhamnolipids, di-rhamnolipids and/or sophorolipids) to reduce the necessary biocide concentration in a coating or paint composition (i.e., having an adjuvant or bio-adjuvant effect). The present invention uses biosurfactants (including but not limited to mono-rhamnolipids, di-rhamnolipids and/or sophorolipids) to reduce the minimum amount of biocide needed in a coating or paint composition (i.e., the biosurfactant having an adjuvant or bio-adjuvant effect). In that regard, rhamnolipid and/or sophorolipid biosurfactants have features of being 'green' surfactants and advantageous for coatings or paints.

This invention provides processes using biosurfactants to produce emulsion polymers and the resulting emulsion polymer products. Particularly, the invention is directed to the use of biosurfactants for synthesis of latex binders, paints and coatings. The biosurfactants may be nonionic or anionic.

In accordance with the invention, aqueous coating compositions (e.g. latex paints) including a biosurfactant are stable.

The biosurfactants can be employed in a number of ways in compositions and methods for improving paints and coatings containing latex binder.

The present invention may employ biosurfactants as a surfactant (emulsifier) during emulsion polymerization to form the latex polymer. In another embodiment, the present invention may employ a biosurfactant as an additive to a latex polymer-containing aqueous dispersion.

The aqueous coating compositions of the invention include the biosurfactant and at least one latex polymer. The at least one latex polymer in the aqueous coating composition can be a pure acrylic, a styrene acrylic, a vinyl acrylic or an acrylated ethylene vinyl acetate copolymer and is more preferably a pure acrylic. The at least one latex polymer is preferably derived from at least one acrylic monomer selected from the group consisting of acrylic acid, acrylic acid esters, methacrylic acid, and methacrylic acid esters. For example, the at least one latex polymer can be a butyl acrylate/methyl methacrylate copolymer or a 2-ethylhexyl acrylate/methyl methacrylate copolymer. Typically, the at least one latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and $C_4$-$C_8$ conjugated dienes.

Latex paint formulations typically comprise additives, e.g., at least one pigment. In a preferred embodiment of the invention, the at least one pigment includes at least one pigment selected from the group consisting of TiO2, CaCO3, clay, aluminum oxide, silicon dioxide, magnesium oxide, sodium oxide, potassium oxide, talc, barytes, zinc oxide, zinc sulfite and mixtures thereof. More preferably, the at least one pigment includes TiO2, calcium carbonate or clay.

In addition to the above components, the aqueous coating composition can include one or more additives selected from the group consisting of dispersants, surfactants, rheology modifiers, defoamers, thickeners, additional biocides, additional mildewcides, colorants, waxes, perfumes and co-solvents.

In one aspect, described herein are coating or paint compositions which contains at least one latex formed from a composition containing at least the biosurfactant.

The present invention includes a method of preparing an aqueous coating composition using the biosurfactant as an emulsifier or part of an emulsifier blend. In an embodiment the biosurfactant is used as an emulsifier during the emulsion polymerization reaction used to make latex polymer. The method comprises preparing the polymer latex binder using emulsion polymerization by feeding latex monomers to a reactor in the presence of at least one initiator and the at least one biosurfactant (emulsifier) compound as described above and polymerizing the latex monomers to produce the latex binder comprising a blend of latex polymer and biosurfactant. The at least one pigment and other additives can then be mixed with the resulting latex binder to produce the aqueous coating composition. The step of preparing the polymer latex binder can include preparing an initiator solution comprising the initiator, preparing a monomer pre-emulsion comprising monomers and the biosurfactant (emulsifier) compound and optional additional surfactants as co-emulsifers as part of an emulsifier blend, adding the initiator solution to a reactor, and adding the monomer pre-emulsion to the reactor.

When employing biosurfactant and optional additional surfactant(s) as an emulsifier or as an emulsifier blend in emulsion polymerization to form the latex polymer, the latex polymer is prepared from a composition wherein the total of the biosurfactant emulsifier or emulsifier blend (containing the biosurfactant emulsifier and one or more additional surfactants) is 0.5 to 10, preferably 1 to 8, or 2 to 6, or 1.5 to 3 parts per 100 parts by weight of monomers used to form the latex polymer of the binder. For example, the pre-emulsion is typically made of from 0.5% to 6% by weight of total emulsifier or emulsifier blend with respect to the total weight of monomer used to make the latex polymer of the binder. Generally more than one surfactant, for example a nonionic surfactant and an anionic surfactant, are used in emulsion polymerization. In this case the biosurfactant would be the non-ionic surfactant. In one embodiment, the emulsifier blend comprises the biosurfactant and at least one anionic surfactant. In another embodiment, the emulsifier blend comprises the biosurfactant, at least one anionic surfactant and at least one non-ionic surfactant. In one embodiment, at least 1 wt. %, or at least 2 wt. %, or at least 4 wt %, or at least 5 wt. %, more typically at least 10 wt. %, or at least 15 wt. %, still more typically at least 20 wt. %, or at least 30 wt %, or at least 50 wt % of the emulsifier blend employed in the emulsion polymerization is at least one biosurfactant. In another embodiment, at least 0.1 wt. %, or at least 0.2 wt. %, or at least 0.4 wt %, or at least 0.5 wt. %, or at least 1.5 wt. %, or at least 2 wt. %, or at least 4 wt. %, or at least 6 wt %, or at least 8 wt % of the emulsifier blend employed in the emulsion polymerization is at least one biosurfactant. In one embodiment, the biosurfactant is a mono-rhamnolipid. In another embodiment, the biosurfactant is selected from the group consisting of mono-rhamnolipids, di-rhamnolipids and Sophorolipids. In another embodiment, the biosurfactant comprises mono-rhamnolipids.

Suitable anionic emulsifiers include alkali metal alkyl aryl sulfonates, alkali metal alkyl sulfates and sulfonated alkyl esters. Specific examples include sodium dodecylbenzenesulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate. Suitable nonionic emulsifiers include, for example, common structures based on polyethylene oxide or oligosaccharides hydrophilic heads.

The incorporation of the biosurfactant (emulsifier) compound in the reaction mixture enables the coating composition to have a lower VOC content while maintaining the stability of the aqueous coating composition at desirable levels. Incorporation of the biosurfactant (emulsifier) compound in the reaction mixture also enables the coating composition to maintain acceptable biocide and mildewcide properties while requiring a lower concentration of biocide(s) and/or preservative(s), wherein the biosurfactant acts as an adjuvant or a bio-adjuvant.

In another embodiment the above-described biosurfactant is used as an additive to already formed aqueous latex polymer dispersion or during formulation of a paint or coating composition. (Formulation is the stage at which additives are added to a base aqueous latex polymer dispersion to make it into a final paint or coating product.) This results in a composition comprising the biosurfactant and the latex polymer. When the biosurfactant is employed as an additive to an already formed latex polymer dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10000 ppm of composition).

If desired the biosurfactant may be employed as an additive to an already formed latex polymer dispersion. In this embodiment the at least one biosurfactant compound selected from the group consisting of rhamnolipids and sophorolipids is added to an already formed latex polymer dispersion to produce the latex binder. Then at least one pigment and other additives can be mixed with the resulting latex binder to produce the paint or aqueous coating composition.

In another embodiment the above-described biosurfactant is used as an additive during formulation of paint or an aqueous coating composition. When the biosurfactant is employed as an additive during formulation of paint or aqueous composition, e.g., aqueous latex polymer dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10000 ppm of composition).

This method comprises adding the at least one biosurfactant selected from the group consisting of rhamnolipids and sophorolipids as a bioadjuvant during formulation of aqueous latex paints or aqueous coating compositions to produce the final paint or aqueous coating compositions. The at least one pigment and other additives can be mixed before or after the biosurfactant to produce the paint or aqueous coating composition. The addition of the biosurfactant during formulation of latex paint or aqueous coating composition maintains the stability of the aqueous coating composition at desirable levels and provides bio-adjuvant properties; that is, incorporation of the emulsifier compound comprising a biosurfactant in the reaction mixture also enables the latex composition or coating composition to maintain acceptable biocide and mildewcide properties while requiring a lower concentration of biocide(s) and/or preservative(s), wherein the biosurfactant acts as an adjuvant or a bio-adjuvant.

In one embodiment, whether utilized as an emulsifier or additive, the biosurfactant comprises at least one mono-rhamnolipid. In one embodiment, whether utilized as an emulsifier or additive, the biosurfactant comprises at least one mono-rhamnolipid and at least one di-rhamnolipid, and optionally at least on sophorolipid.

In one embodiment, whether utilized as an emulsifier or additive, the biosurfactant comprises at least one mono-rhamnolipid and at least one di-rhamnolipid, wherein the wt % ratio of mono-rhamnolipid to di-rhamnolipid is in the range of between about 90:10 and 99:1, respectively.

In one embodiment, whether utilized as an emulsifier or additive, the biosurfactant comprises at least one mono-rhamnolipid and at least one di-rhamnolipid, wherein the wt % ratio of mono-rhamnolipid to di-rhamnolipid is in the range of between about 85:15 and 99.5:0.5, respectively.

In one embodiment, whether utilized as an emulsifier or additive, the biosurfactant comprises at least one mono-rhamnolipid and at least one di-rhamnolipid, wherein the wt % ratio of mono-rhamnolipid to di-rhamnolipid is in the range of between about 80:20 and 99.9:0.1, respectively.

In one embodiment, whether utilized as an emulsifier or additive, the biosurfactant comprises at least one mono-rhamnolipid and at least one di-rhamnolipid, wherein the wt % ratio of mono-rhamnolipid to di-rhamnolipid is in the range of between about 50:50 and 99.9:0.1, respectively.

In one embodiment, whether utilized as an emulsifier or additive, the biosurfactant comprises at least one mono-rhamnolipid and at least one di-rhamnolipid, wherein the wt % ratio of mono-rhamnolipid to di-rhamnolipid is in the range of between about 40:60 and 99.9:0.1, respectively.

In one embodiment, the mono-rhamnolipid acts as a bio-adjuvant designed to reduce the necessary biocide concentration in the coating composition. When used in the emulsion polymerization process to make the latex composition, incorporation of an emulsifier compound comprising a biosurfactant in the reaction mixture also enables the latex composition to maintain acceptable biocide and/or mildewcide properties while requiring a lower concentration of biocide(s) and/or preservative(s), wherein the biosurfactant acts as an adjuvant or a bio-adjuvant.

In one embodiment, when used as an adjuvant, the biosurfactant does not possess anti-microbial properties.

In another embodiment, the biosurfactant of the present invention comprises a mono-rhamnolipids, which is believed to bind metals and/or nutrients necessary for bacterial growth, with the position that metal chelation works to tie up a required component of bacterial growth.

In one embodiment, the biosurfactant, which can be a mono-rhamnolipid, when used at low levels at or below the CMC, show neutral or no effect on the growth of various microorganisms.

In one embodiment, when used at levels (below or around the CMC value), rhamnolipids act to lower the amount of isothiazolinone required to adequately preserve latex coatings and paints. And finally, with respect to possible modes of action, Solvay has provided a summary and literature citations suggesting that the rhamnolipids act, in part, to chelate metals of benefit to microbes.

In one embodiment, the biosurfactants as described herein are not active ingredients, but rather compounds which function to enhance or prolong the activity of an active ingredient by physical action. In other words, the mono-rhamnolipid (as well as mixtures thereof) utilized as an adjuvant product acts to lower the amount of biocide (or preservative) otherwise required to protect the paint or coating from microbial degradation.

In one embodiment, the effective amount of the biosurfactant, which in one embodiment is at least one mono-rhamnolipid, reduces the necessary biocide concentration in the coating composition in an amount greater than 20%, or 30% or 40%, or 50% by weight as compared to an analogous composition that lacks the biosurfactant.

In one embodiment, the effective amount of the biosurfactant, which in one embodiment is at least one mono-rhamnolipid, reduces the necessary biocide concentration in the coating composition in an amount greater than 60%, or 70%, or 80% by weight as compared to an analogous composition that lacks the biosurfactant. In another embodiment, the effective amount of the biosurfactant reduces the necessary biocide concentration in the coating composition in an amount greater than 55%, 60%, 65%, 70%, 75%, 80%, 85%, 90% or 95% by weight as compared to an analogous composition that lacks the biosurfactant.

In one embodiment, the effective amount of the biosurfactant is less than 5000 ppm, 2000 ppm, 3000 ppm, 1000 ppm, 800 ppm, 500 ppm, 300 ppm, 200 ppm or 100 ppm of composition or dispersion.

In another embodiment, the effective amount of the biosurfactant is less than 100 ppm, or 90 ppm, or 80 ppm, or 70 ppm, or 60 ppm of composition. In yet another embodiment, the effective amount of the biosurfactant is from about 1 ppm to about 60 ppm of composition. In a further embodiment, the effective amount of the biosurfactant is from about 10 ppm to about 50 ppm of composition. In another embodiment, the effective amount of the biosurfactant is from about 20 ppm to about 50 ppm of composition. In yet another embodiment the effective amount of the biosurfactant is from about 25 ppm to about 45 ppm of composition.

In another embodiment, the effective amount of the biosurfactant is less than 5000 ppm, or 4000 ppm, or 3000, or 2000 ppm, or 1000 ppm of composition.

In another embodiment, the effective amount of the biosurfactant is less than 900 ppm, or 800 ppm, or 500 ppm, or 300 ppm, or 200 ppm of composition.

When used in compositions and methods of the present invention the biosurfactant selected from the group consisting of rhamnolipid and/or sophorolipid can be the sole biosurfactant/surfactant. In one embodiment, compositions of the present invention may have an absence of biopolymers, for example an absence of dextran.

Compositions of the present invention may have an absence of polyvinylalcohol based block copolymer such as those in the abstract of U.S. Pat. No. 7,348,382 B2 to Ueno.

In one aspect, described herein are coating compositions which comprise:
(a) at least one latex polymer;
(b) a biocide;
(c) a biosurfactant composition, which in one embodiment comprises a mono-rhamnolipid, in an amount effective to reduce the necessary biocide concentration in the coating composition compared to an analogous composition that lacks the biosurfactant; and
(d) water.

In another aspect, described herein are processes for using a biosurfactant composition in polymerization, comprising the step of emulsion polymerizing a reaction mixture to prepare a latex polymer, said reaction mixture comprising at least one monomer and at least one biosurfactant composition. In one embodiment, the biosurfactant composition comprises a mono-rhamnolipid.

In yet another aspect, described herein are methods of preparing an aqueous coating composition, comprising contacting at least one latex polymer aqueous dispersion comprising at least one biosurfactant with at least one biocide, wherein the biosurfactant is present in an amount effective to reduce the necessary biocide concentration in the coating composition compared to an analogous composition that lacks the biosurfactant. In one embodiment, the biosurfactant comprises a mono-rhamnolipid.

These and other features and advantages of the present invention will become more readily apparent to those skilled in the art upon consideration of the following detailed description, which describe both the preferred and alternative embodiments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
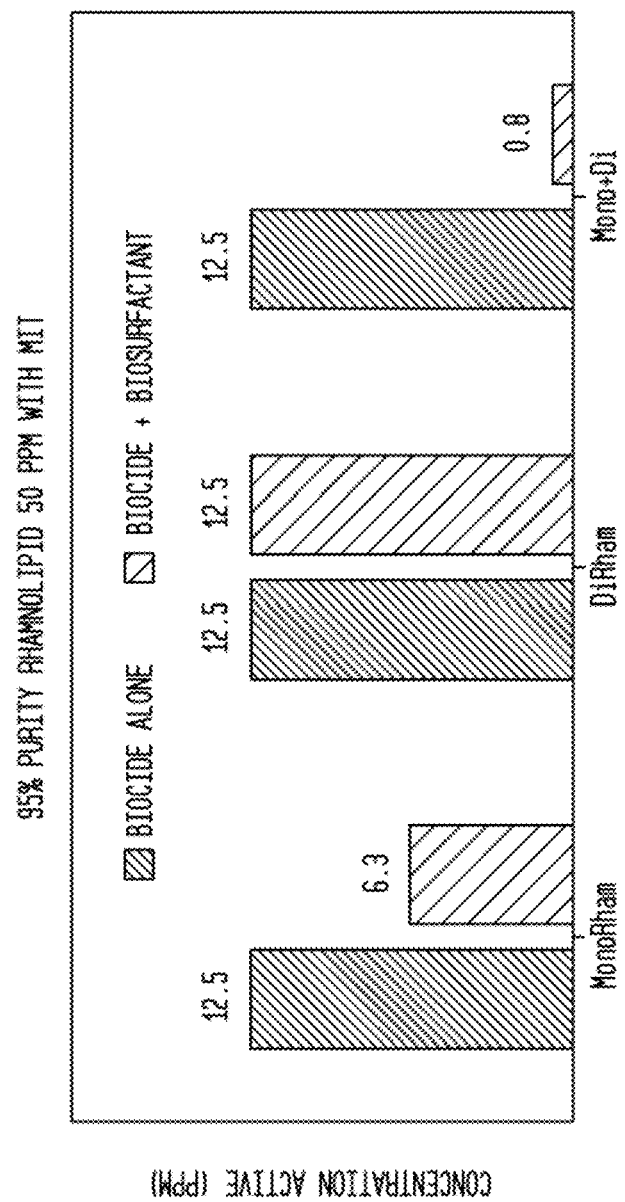
FIG. 1 shows the results of 95% purity rhamnolipid 50 ppm with MIT.

The present invention relates to the use of a particular family of biosurfactants for latex dispersions, binders, paints and coatings. The present invention provides aqueous compositions, for example, aqueous coating compositions, with low-VOC content comparable to conventional aqueous coating compositions and beneficial biocide and mildewcide properties. The aqueous compositions of the invention are aqueous polymer dispersions which include at least one latex polymer copolymerized or blended with a particular family of biosurfactants, e.g., rhamnolipids. Paints or other aqueous coatings of the present invention typically further include at least one pigment. Typically the latex has a Tg of less than 10° C., more typically less than 5° C., still more typically in the range from 5 to −10° C., e.g., 0° C.

The members of the particular family of biosurfactants can be employed in a number of ways for improving latex aqueous dispersions, binders, coatings and paints. The present invention may employ biosurfactants as (1) a surfactant (emulsifier) to be present during latex polymer formation, and/or (2) an additive to aqueous dispersions, binders, coatings or paints comprising latex polymer or copolymer.

As used herein, the term "alkyl" means a monovalent straight or branched saturated hydrocarbon radical, more typically, a monovalent straight or branched saturated ($C_1$-$C_{40}$) hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tertacontyl.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "alkoxyalkyl" means an alkyl radical that is substituted with one or more alkoxy substituents, more typically a ($C_1$-$C_{22}$)alkyloxy-($C_1$-$C_6$)alkyl radical, such as methoxymethyl, and ethoxybutyl.

As used herein, the term "alkenyl" means an unsaturated straight or branched hydrocarbon radical, more typically an unsaturated straight, branched, ($C_2$-$C_{22}$) hydrocarbon radical, that contains one or more carbon-carbon double bonds, such as, for example, ethenyl, n-propenyl, iso-propenyl.

As used herein, terms "aqueous medium" and "aqueous media" are used herein to refer to any liquid medium of which water is a major component. Thus, the term includes water per se as well as aqueous solutions and dispersions.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkoxyl, alkenyl, halo, haloalkyl, monocyclic aryl, or amino, such as, for example, phenyl, methylphenyl, methoxyphenyl, dimethylphenyl, trimethylphenyl, chlorophenyl, trichloromethylphenyl, triisobutyl phenyl, tristyrylphenyl, and aminophenyl.

As used herein, the term "aralkyl" means an alkyl group substituted with one or more aryl groups, more typically a ($C_1$-$C_{18}$)alkyl substituted with one or more ($C_6$-$C_{14}$)aryl substituents, such as, for example, phenylmethyl, phenylethyl, and triphenylmethyl.

As used herein, the term "aryloxy" means an oxy radical substituted with an aryl group, such as for example, phenyloxy, methylphenyl oxy, isopropylmethylphenyloxy.

The term "biopolymer" includes polysaccharides, for example dextran, proteins and polyesters and combinations thereof.

As used herein, the terminology "($C_x$-$C_y$)" in reference to an organic group, wherein x and y are each integers, indicates that the group may contain from x carbon atoms to y carbon atoms per group.

As used herein, the term "cycloalkenyl" means an unsaturated hydrocarbon radical, typically an unsaturated ($C_5$-$C_{22}$) hydrocarbon radical, that contains one or more cyclic alkenyl rings and which may optionally be substituted on one or more carbon atoms of the ring with one or two ($C_1$-$C_6$) alkyl groups per carbon atom, such as cyclohexenyl, cycloheptenyl, and "bicycloalkenyl" means a cycloalkenyl ring system that comprises two condensed rings, such as bicycloheptenyl.

As used herein, the term "cycloalkyl" means a saturated hydrocarbon radical, more typically a saturated ($C_5$-$C_{22}$) hydrocarbon radical, that includes one or more cyclic alkyl rings, which may optionally be substituted on one or more carbon atoms of the ring with one or two ($C_1$-$C_6$)alkyl groups per carbon atom, such as, for example, cyclopentyl, cycloheptyl, cyclooctyl, and "bicyloalkyl" means a cycloalkyl ring system that comprises two condensed rings, such as bicycloheptyl.

As used herein, the critical micelle concentration (CMC) is the concentration of surfactants above which micelles form and all additional surfactants added to the system go to micelles. Before reaching the CMC, the surface tension changes strongly with the concentration of the surfactant, while after reaching the CMC, the surface tension remains relatively constant or changes with a lower slope.

As used herein, an indication that a composition is "free" of a specific material means the composition contains no measurable amount of that material.

As used herein, the term "heterocyclic" means a saturated or unsaturated organic radical that comprises a ring or condensed ring system, typically comprising from 4 to 16 ring atoms per ring or ring system, wherein such ring atoms comprise carbon atoms and at least one heteroatom, such as for example, O, N, S, or P per ring or ring system, which may optionally be substituted on one or more of the ring atoms, such as, for example, thiophenyl, benzothiphenyl, thianthrenyl, pyranyl, benzofuranyl, xanthenyl, pyrolidinyl, pyrrolyl, pyradinyl, pyrazinyl, pyrimadinyl, pyridazinyl, indolyl, quinonyl, carbazolyl, phenathrolinyl, thiazolyl, oxazolyl, phenoxazinyl, or phosphabenzenyl.

As used herein, the term "hydroxyalkyl" means an alkyl radical, more typically a ($C_1$-$C_{22}$)alkyl radical, that is substituted with one or more hydroxyl groups, such as for example, hydroxymethyl, hydroxyethyl, hydroxypropyl, and hydroxydecyl.

As used herein the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

As used herein, "molecular weight" in reference to a polymer or any portion thereof, means to the weight-average molecular weight ("$M_w$") of said polymer or portion, wherein $M_w$ of a polymer is a value measured by gel permeation chromatography with an aqueous eluent or an organic eluent (for example dimethylacetamide, dimethylformamide, and the like), depending on the composition of the polymer, light scattering (DLS or alternatively MALLS), viscometry, or a number of other standard techniques and $M_w$ of a portion of a polymer is a value calculated according to known techniques from the amounts of monomers, polymers, initiators and/or transfer agents used to make the said portion.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, an indication that a composition is "substantially free" of a specific material, means the composition contains no more than an insubstantial amount of that material, and an "insubstantial amount" means an amount that does not measurably affect the desired properties of the composition.

As used herein, the term "surfactant" means a compound that reduces surface tension when dissolved in water.

"Effective amount" means the amount of biosurfactant needed to reduce the concentration of biocide or means the minimum amount of biosurfactant needed to reduce the concentration of biocide.

"Surfactant effective amount" means the amount of the surfactant that provides a surfactant effect to enhance the stability of emulsions of the polymers.

The term "architectural coating" as used herein is intended to encompass a mixture of resin, optionally pigment, and a suitable liquid vehicle that is reasonably fluid and provides a thin and adherent layer when applied to a substrate. As such, the term "architectural coating" is intended to encompass paints, lacquers, varnishes, base coats, clear coats, primers and the like.

Paints that dry by solvent evaporation and contain a solid binder dissolved in a solvent are known as lacquers. A solid film forms when the solvent evaporates, and because the film can re-dissolve in solvent, lacquers are unsuitable for applications where chemical resistance is important.

Latex paint is a water-borne dispersion of sub-micrometre polymer particles. The term "latex" in the context of paint simply means an aqueous dispersion; latex rubber (the sap of the rubber tree that has historically been called latex) is not an ingredient. These dispersions are prepared by emulsion polymerization. Latex paints cure by a process called coalescence where first the water, and then the trace, or coalescing, solvent, evaporate and draw together and soften the latex binder particles and fuse them together into irreversibly bound networked structures, so that the paint will not redissolve in the solvent/water that originally carried it. The residual surfactants in paint as well as hydrolytic effects with some polymers cause the paint to remain susceptible to softening and, over time, degradation by water.

Emulsion Polymerization

In a first embodiment, the rhamnolipid and/or sophorolipid (also known as sophorose lipid) biosurfactant is used as an emulsifier during the emulsion polymerization reaction used to make latex polymer.

Emulsion polymerization is discussed in G. Pohlein, "Emulsion Polymerization", Encyclopedia of Polymer Science and Engineering, vol. 6, pp. 1-51 (John Wiley & Sons, Inc., NY, NY, 1986), the disclosure of which is incorporated herein by reference. Emulsion polymerization is a heterogeneous reaction process in which unsaturated monomers or monomer solutions are dispersed in a continuous phase with the aid of an emulsifier system and polymerized with free-radical or redox initiators. The product, a colloidal dispersion of the polymer or polymer solution, is called a latex or a latex dispersion.

The monomers typically employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. This is further discussed below in the section entitled "Latex Monomers".

In the above process, suitable initiators, reducing agents, catalysts and surfactants are well known in the art of emulsion polymerization. Typical initiators include ammonium persulfate (APS), hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like. Commonly used redox initiation systems are described e.g., by A. S. Sarac in Progress in Polymer Science 24(1999), 1149-1204.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above-described reducing agents, promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

Rhamnolipids are biosurfactants comprised of one or two 1-rhamnose units linked to one or two β-hydroxy fatty acids. A rhamnolipids mixture can therefore contains up to 4 congeners in different proportions depending on various conditions. The present discovery relates to the use of particular congeners as adjuvants to conventional biocides, in how these preferred congeners surprisingly help lower the amount of biocide required to kill microorganisms. For instance, di-rhamno-mono-lipids demonstrated poor adjuvants properties, while mono-rhamno-mono-lipids showed superior enhancement. These findings suggest that, in rhamnolipids mixtures, only certain congeners are in fact responsible for the adjuvant properties.

In some embodiments, however, for some types of microorganism (which term would covers at least certain bacteria and fungi mold), there is a synergistic effect when mixing mono-rhamnolipids and di-rhamnolipids Emulsion polymerization occurs in the presence of an emulsifier. The biosurfactant monomer is added as emulsifier in an effective amount to enhance the stability of emulsions of the polymers with or without additional emulsifier. The rhamnolipid and/or sophorose lipid (also known as sophorolipid) biosurfactant may be the sole emulsifier or it may be employed with additional emulsifiers (as a co-emulsifier) other than the rhamnolipid and/or sophorose lipid biosurfactant.

When employing biosurfactant and optional additional surfactant(s) as an emulsifier or as an emulsifier blend in emulsion polymerization to form the latex polymer, the latex polymer is prepared from a composition wherein the total of the biosurfactant emulsifier or emulsifier blend (containing the biosurfactant emulsifier and one or more additional surfactants) is 0.5 to 10, preferably 1 to 8, or 2 to 6, or 1.5 to 3 parts per 100 parts by weight of monomers used to form the latex polymer of the binder. For example, the pre-emulsion is typically made of from 0.5% to 6% by weight of total emulsifier or emulsifier blend with respect to the total weight of monomer used to make the latex polymer of the binder. Generally more than one surfactant, for example a nonionic surfactant and an anionic surfactant, are used in emulsion polymerization. In this case the biosurfactant would be the non-ionic surfactant. In one embodiment, the emulsifier blend comprises the biosurfactant and at least one anionic surfactant. In another embodiment, the emulsifier blend comprises the biosurfactant, at least one anionic surfactant and at least one non-ionic surfactant. Typically at least 1 wt. %, or at least 2 wt. %, or at least 4 wt %, or at least 5 wt. %, more typically at least 10 wt. %, or at least 15 wt. %, still more typically at least 20 wt. %, or at least 30 wt %, or at least 50 wt % of the emulsifier blend employed in the emulsion polymerization is at least one biosurfactant.

Typical optional additional emulsifiers are ionic or non-ionic surfactants that are polymerizable or non-polymerizable during polymerization. Suitable ionic and nonionic surfactants are alkyl polyglycol ethers such as ethoxylation products of lauryl, tridecyl, oleyl, and stearyl alcohols; alkyl phenol polyglycol ethers such as ethoxylation products of octyl- or nonylphenol, diisopropyl phenol, triisopropyl phenol; alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

In one embodiment, anionic emulsifiers include alkali metal alkyl aryl sulfonates, alkali metal alkyl sulfates and sulfonated alkyl esters. Specific examples include sodium dodecylbenzenesulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate. In a further embodiment, nonionic emulsifiers include, for example, common structures based on polyethylene oxide or oligosaccharides hydrophilic heads.

The polymer latex or polymer latex binder can be produced by first preparing an initiator solution comprising the initiator and water. A monomer pre-emulsion is also prepared comprising at least a portion of the one or more surfactants, monomers, water and additional additives such as NaOH, chain transfer agent, etc. The one or more surfactants in the monomer pre-emulsion include the biosurfactant and above-described optional additional surfactant.

Thus, a typical process of emulsion polymerization preferably involves charging water to a reactor and feeding as separate streams a pre-emulsion of the monomer and a solution of the initiator. In particular, the polymer latex binder can be prepared using emulsion polymerization by feeding the monomers used to form the latex binder to a reactor in the presence of at least one initiator and at least one biosurfactant and polymerizing the monomers to produce the latex binder. Typically the initiator solution and monomer pre-emulsion are continuously added to the reactor over a predetermined period of time (e.g. 1.5-5 hours) to cause polymerization of latex monomers to produce the latex polymer.

Prior to the addition of the initiator solution and the monomer pre-emulsion, a seed latex such as a polystyrene seed latex can be added to the reactor. For example, a small amount of the pre-emulsion and a portion of the initiator may be charged initially at the reaction temperature to produce "seed" latex. The "seed" latex procedure results in better particle-size reproducibility.

Under "normal" initiation conditions, that is initiation conditions under which the initiator is activated by heat, the polymerization is normally carried out at about 60-90° C. A typical "normal" initiated process, for example, could employ ammonium persulfate as initiator at a reaction temperature of 80+/−2° C. Under "redox" initiation conditions, namely initiation conditions under which the initiator is activated by a reducing agent, the polymerization is normally carried out at 60-70° C. Normally, the reducing agent is added as a separate solution. A typical "redox" initiated process, for example, could employ potassium persulfate as the initiator and sodium metabisulfite as the reducing agent at a reaction temperature of 65+/−2° C.

The reactor is operated at desired reaction temperature at least until all the monomers are fed to produce the polymer latex binder. Once the polymer latex binder is prepared, it is preferably chemically stripped thereby decreasing its residual monomer content. Preferably, it is chemically stripped by continuously adding an oxidant such as a peroxide (e.g. t-butylhydroperoxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and other additives added after the chemical stripping step.

In the above emulsions, the polymer preferably exists as a generally spherical particle, dispersed in water, with a diameter of about 50 nanometers to about 500 nanometers.

The monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, (alpha)-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, and ethylene. It is also possible to include $C_4$-$C_8$ conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate.

Commonly used monomers in making acrylic paints are butyl acrylate, methyl methacrylate, ethyl acrylate and the like. In acrylic paint compositions the polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

The latex polymer dispersion (used interchangeably herein with the term "latex dispersion") preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

Rhamnolipids:

Rhamnolipid biosurfactants are surface active compounds released by microorganisms. They are biodegradable non-toxic and eco-friendly materials. Their production depends on the fermentation conditions, environmental factors and nutrient availability. Biosurfactants are extracted from cell-free supernatant using the solvent extraction procedure.

*Pseudomonas aeruginosa* DSI0-129 was used to produce rhamnolipid (Rahman et al., 2002a, b, 2003). Rhamnolipid may also be produced from *Pseudomonas* sp., *Serratia rubidea* according to Pattanathu, Production, Characterisation and Applications of Biosurfactants-Review, Biotechnology 7 (2): 360-370, 2008, ISSN 1682-296X (2008) Asian Network for Scientific Information.

Rhamnolipid bio-surfactant secreted from *Pseudomonas aeruginosa* is a naturally occurring extracellular glycolipid found in the soil and on plants. Rhamnolipids bio-surfactants provide antibacterial and antifungal activity, and low toxicity levels.

Rhamnolipids have been used in the medical field to combat certain types of bacteria, viruses, and fungi. US 2011/0270207 A1 to DeSanto discloses rhamnolipid-based formulations to clean, disinfect, deodorize, and act as an antimicrobial and antifungal agent for living and working environments. In addition, it discloses the use of rhamnolipids to create a bio-film when applied to a surface, which prevents the growth of bacteria and fungus. This technique is asserted to be useful to create clean surface areas for medical procedures, chemical testing, during food preparation, and for daycare centers and hospitals. Rhamnolipid biosurfactants produced by *Pseudomonas aeruginosa* DS10-129 showed significant applications in the bioremediation of hydrocarbons in gasoline-spilled soil and petroleum oily sludge. Rhamnolipid biosurfactant enhanced the bioremediation process by releasing the weathered oil from the soil matrices and enhanced the bioavailability of hydrocarbons for microbial degradation. It is having potential applications in the remediation of hydrocarbon contaminated sites. The biosurfactant Rhamnolipid is an EPA registered product for use as a bio-fungicide for agricultural use.

Bacteria of the genus *Pseudomonas* are known to produce glycolipid surfactant containing rhamnose and 3-hydroxy fatty acids (Lang and Wullbrandt, 1999; Rahman et al., 2002b). Rhamnolipids produced by *Pseudomonas aeruginosa* have been widely studied and reported as a mixture of homologous species RL1 ($RhC_{10}C_{10}$), RL2 ($RhC_{10}$), RL3 ($Rh_2C_{10}C_{10}$) and RL4 ($Rh_2C_{10}$) (Syldatk and Wagner, 1987; Lang and Wagner, 1987; Rahman et al., 2002b). Using virgin olive oil (Healy et al., 1996), a rhamnolipid was produced by *Pseudomonas fluorescens* NCIMB 11712 that is a methyl pentose monosaccharide. Disaccharide rhamnolipids are formed by condensing two moles of rhamnose sugar and an acetal group links the hydrophobic group. However, the lipid part of the molecule contains ester and carboxyl groups. Rhamnolipids produced by *Pseudomonas aeruginosa* strains are among the most effective surfactants when applied for the removal of hydrophobic compounds from contaminated soils (Rahman et al., 2006). They posses low average minimum surface tension of (30-32 mN $m^{-1}$; high average emulsifying activity of (10.4-15.5 U $mL^{-1}$ filtrate), low critical micelle concentration (CMC) (5-65 mg $L^{-1}$) and high affinity for hydrophobic organic molecules (Van Dyke et al., 1993).

Structural formula I shows the structure of a typical mono-rhamnolipid, RLL or R1 (alpha-L-Rhamnopyranosyl-beta-hydroxydecanoyl-beta-hydrooxydecanoate, C26H48O9 (504 g/mol).

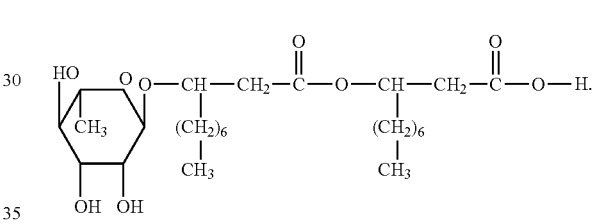

I

Structure II shows a structure of a typical di-rhamnolipid, RRLL or R2 (2-O-alpha-L-Rhamnopyranosyl-alpha-L-thamnopyranosyl-beta-hydroxydecanoyl-beta-hydrooxydecanoate, C32H58O13 (650 g/mol):

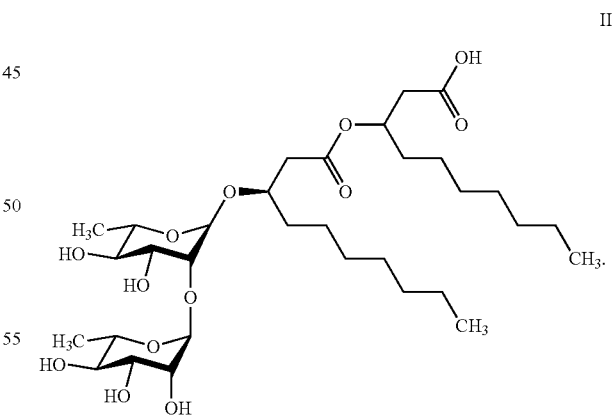

II

As mentioned above, there are two major groups of rhamnolipids; mono-rhamnolipids and di-rhamnolipids.

Mono-rhamnolipids have a single rhamnose sugar ring. The basic formula (which is most often produced by *P. aeruginosa*) is:

L-rhamnosyl-beta-hydroxydecanoyl-beta-hydroxydecanoate (often referred to as Rha-$C_{10}$-$C_{10}$) with a formula of $C_{26}H_{48}O_9$ The IUPAC Name is 3-[3-[(2R,3R,4R,5R,6S)-3,4,5-trihydroxy-6-methyloxan-2-yl]oxydecanoyloxy]decanoic acid Di-rhamnolipids have two rhamnose sugar rings. The basic formula is: L-rhamnosyl-L-rhamnosyl-beta-hydroxydecanoyl-beta-hydroxydecanoate (often referred to as Rha-Rha-$C_{10}$-$C_{10}$) with a formula of $C_{32}H_{58}O_{13}$ The IUPAC Name is: 3-[3-[4,5-dihydroxy-6-methyl-3-(3,4,5-trihydroxy-6-methyloxan-2-yl)oxyoxan-2-yl]oxydecanoyloxy]decanoic acid Some other forms or names for the more common di-rhamnolipids include:
L-rhamnopyranosyl-L-rhamnopyranosyl-beta-hydroxydecanoyl-beta-hydroxydecanoate (often referred to as Rha-Rha-$C_{10}$-$C_{10}$)
L-rhamnopyranosyl-L-rhamnopyranosyl-beta-hydroxydecanoyl-beta-hydroxydodecanoate (often referred to as Rha-Rha-$C_{10}$-$C_{12}$)
L-rhamnopyranosyl-L-rhamnopyranosyl-beta-hydroxytetradecanoyl-beta-hydroxytetradecanoate (often referred to as Rha-Rha-$C_{14}$-$C_{14}$)

Other more specific naming conventions for rhamnolipids include:
Decanoic acid, 3-[[6-deoxy-2-O-(6-deoxy-alpha-L-mannopyranosyl)-alpha-L-mannopyranosyl]oxy]-, 1-(carboxymethyl)octyl ester,
1-(carboxymethyl)octyl 3-[(6-deoxy-alpha-L-mannopyranosyl)oxy]decanoate,
3-[3'-(L-rhamnopyranosyloxy)decanoyloxy]decanoic acid
3-[3'-(2''-O-α-L-rhamnopyranosyl-α-L-rhamnopyranosyloxy)decanoyloxy]decanoic acid Rhamnolipids have been found with combinations of the following fatty acids:
Hydroxyoctanoyl=$C_8$
Hydroxydecanoyl=$C_{10}$ Hydroxydecanate=$C_{10}$
Hydroxydodecanoyl=$C_{12}$ Hydroxydodecanate=$C_{12}$
Hydroxytetradecanoyl=$C_{14}$ Hydroxytetradecanate=$C_{14}$ A compound where the total carbon count is the same, but the $C_{10}$-$C_{12}$ is switched to $C_{12}$-$C_{10}$ is called a structural isomer, meaning the formula is the same for both molecules, but the bonds or links are connected differently.

In various papers instead of mono-rhamnolipid as Rha-, it may be abbreviated as Rh or RL2. Similarly, instead of Rha-Rha- designating a di-rhamnolipid, Rh-Rh- or RL1 is used. For historical reasons "rhamnolipid 2" is a mono-rhamnolipid and "rhamnolipid 1" is a di-rhamnolipid. This actually leads to some ambiguity in the usage or "RL1" and "RL2" in the literature. For purposes of the present specification "rhamnolipid 1" or "RL1" is a mono-rhamnolipid and "rhamnolipid 2" or "RL2" is a di-rhamnolipid.

In various studies the following rhamnolipids have been detected as produced by the following bacteria: ($C_{12:1}$, $C_{14:1}$ indicate fatty acyl chains with double bonds.)

Rhamnolipids produced by *P. aeruginosa* (mono-rhamnolipids):
Rha-$C_8$-$C_{10}$, Rha-$C_{10}$-$C_8$, Rha-$C_{10}$-$C_{12}$, Rha-$C_{10}$-$C_{12:1}$, Rha-$C_{12}$-$C_{10}$, Rha-$C_{12:1}$-$C_{10}$ Rhamnolipids produced by *P. aeruginosa* (di-rhamnolipids):
Rha-Rha-$C_8$-$C_{10}$, Rha-Rha-$C_8$-$C_{12:1}$, Rha-Rha-$C_{10}$-$C_8$, Rha-Rha-$C_{10}$-$C_{10}$, Rha-Rha-$C_{10}$-$C_{12:1}$, Rha-Rha-$C_{10}$-$C_{12}$, Rha-Rha-$C_{12}$-$C_{10}$, Rha-Rha-$C_{12:1}$-$C_{12}$, Rha-Rha-$C_{10}$-$C_{14:1}$ Rhamnolipids produced by *P. aeruginosa* (unidentified as either mono- or di-rhamnolipids):
$C_8$-$C_8$, $C_8$-$C_{12:1}$, $C_{12:1}$-$C_8$, $C_{12}$-$C_{10}$, $C_{12:1}$-$C_{10}$, $C_{12}$-$C_{12}$, $C_{12:1}$-$C_{12}$, $C_{14}$-$C_{10}$, $C_{14:1}$-$C_{10}$, $C_{14}$-$C_{14}$.

Rhamnolipids produced by *P. chlororaphis* (mono-rhamnolipids only):
Rha-$C_{10}$-$C_8$, Rha-$C_{12}$-$C_{10}$, Rha-$C_{12:1}$-$C_{10}$, Rha-$C_{12}$-$C_{12}$, Rha-$C_{12:1}$-$C_{12}$, Rha-$C_{14}$-$C_{10}$, Rha-$C_{14:1}$-$C_{10}$ Rhamnolipids produced by *Burkholdera pseudomallei* (di-rhamnolipids only):
Rha-Rha-$C_{14}$-$C_{14}$ Rhamnolipids produced by *Burkholdera* (*Pseudomonas*) *plantarii* (di-rhamnolipids only):
Rha-Rha-$C_{14}$-$C_{14}$ The rhamnolipids formulations for use as emulsifiers or additives in the present invention may be crude or highly purified rhamnolipids. A crude rhamnolipid formulation contains a rhamnolipid, having many impurities both external impurities, and/or a variety of various Rhamnolipid mixtures, which causes a reduced effect on the formulation. A highly purified rhamnolipid formulation contains a rhamnolipid whose external impurities have been removed, and/or the rhamnolipids have been purified to meet certain parameters to cause an increased effect on the formulation which includes di-rhamnolipid, mono-rhamnolipid or a certain mixture of both.

The rhamnolipids formulations are made by eliminating unwanted impurities from the initial mixture and then establishing the percentage and type of rhamnolipid to be resident in the final mixture and simply diluting the rhamnolipid preparation with a carrier or diluents, preferably water or ethanol. The present invention is not limited by the use of water and ethanol as carrier or diluents. The present invention contemplates the use of any carrier or diluents, as long as it is compatible with rhamnolipid.

In general, the rhamnolipid formulation ("crude" or partially purified therefrom) is diluted to a final concentration of less than 70%, for example, about 5% to about 70%, rhamnolipid in the final rhamnolipid formulation.

In the present invention the use of the term "rhamnolipid" implies indistinctively crude or highly purified Rhamnolipids, and various mixtures of the Rhamnolipid components.

As mentioned above, Rhamnolipids are secreted from *Pseudomonas aeruginosa*. Typically, the bacterium *Pseudomonas aeruginosa* is cultured in a suitable medium and grown to a desired density. The bacteria themselves are removed from the culture media by any method known in the art, such as centrifugation. The supernatant may be used directly as the crude formulation, or further processing steps well-known to those of skilled in the art may be carried out (e.g. concentration, filtration, column chromatography, and the like). Notably, however, the final rhamnolipid formulation is not highly purified and is referred to as "crude rhamnolipid", and typically contains a mixture of both mono-rhamnolipids and di-rhamnolipids, and other compounds. Those of skill in the art will recognize the precise details of cultivation and partial purification may vary somewhat and still be within the scope of the invention.

Preparation of crude rhamnolipid formulations and highly purified rhamnolipid formulations may be prepared by methods that are well-known to those of skill in the art.

The compositions of the invention may comprise one or more types of rhamnolipids. These rhamnolipids may be a mono-rhamnolipid, a di-rhamnolipid, or a combination of the two.

Sophorolipids:
Sophorolipids (also known as sophorose lipids or SLs) are a group of biosurfactants consisting of a dimeric sugar (sophorose) and a hydroxyl fatty acid, linked by a beta-glycosidic bond (Asmer et al., 1988).

According to Hu and Ju, (2001) as well as US patent application publication no. 2011/0237531 to Yanagisawa et al. there are two types of SLs namely, the acidic (non-lactonic) SLs and the lactonic SLs. The hydroxyl fatty acid moiety of the acidic SLs has a free carboxylic acid functional group while that of the lactonic SLs forms a macrocyclic lactone ring with the 4"-hydroxyl group of the sophorose by intramolecular esterification. Sophorose lipids are a type of glycolipid biosurfactants and are generally categorized into two forms: the lactone form represented by the following structural formula (III):

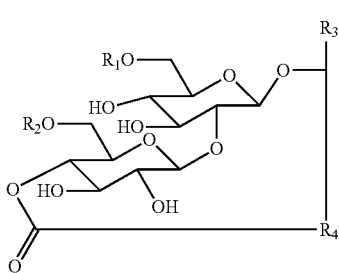

III wherein R1 and R2 each represent H or COCH3; R3 represents H or CH3; and R4 represents a saturated or unsaturated C12-16 hydrocarbon group when R3 is H, and R4 represents a saturated or unsaturated C11-15 hydrocarbon group when R3 is CH3, and the acid form represented by the following formula (IV)

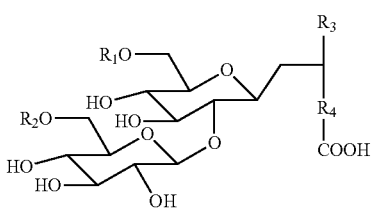

IV wherein R1 to R4 are as defined above.

As is clear from the above, sophorose lipids have a number of derivatives which are characterized by the positions and number of acetyl groups, the presence or absence of double bonds in the fatty acid side chain, the length of the carbon chain of the fatty acid side chain, the position of the glycosidic ether bond in the fatty acid side chain, the positions of hydroxyl groups on the sophorose moiety that is a part of a lactone ring, and other structural parameters. Sophorose lipids generally occur as a mixture of these compounds. In general, sophorose lipids are produced in a highly viscous oil form that is difficult to handle. However, sophorose lipids in the diacetyl lactone form, which are comparatively high in hydrophobicity, can be produced in a solid form.

The sophorose lipid biosurfactant according to the present invention can be produced by culturing a microorganism capable of producing a glycolipid biosurfactant. Any microorganism capable of producing a glycolipid biosurfactant can be used for the production of sophorose lipids. Sophorose lipid biosurfactant can be produced by yeasts of the genera *Candida*, for example, *Candida bombicola, Torulopsis*, for example, *Torulopsis apicola, Wickerhamiella*, and *Starmerella* according to US 2011/0237531. They can be produced by *Torulopsis* sp., *Candida apicola, Candida lipolytica, Candida bogoriensis* or *Torulopsis bombicola* according to Pattanathu, Production, Characterisation and Applications of Biosurfactants-Review, Biotechnology 7 (2): 360-370, 2008, ISSN 1682-296X (2008) Asian Network for Scientific Information.

The sophorose lipids can be produced by culturing the above-mentioned microorganism in a culture medium. For the culture process in the present invention, any medium can generally be used, provided it contains assimilable nutritional sources for yeast cells.

Latex Monomers

For purposes of this description, monomers from which latex polymers may be derived are termed "latex monomers".

Preferably, these latex monomers comprise at least one acrylic monomer selected from the group consisting of acrylic acid, acrylic acid esters, methacrylic acid, and methacrylic acid esters. In addition, the other monomers for making the latex polymer can optionally be selected from one or more monomers selected from the group consisting of styrene, a-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark VEOVA from Shell Chemical Company or sold as EXXAR neo vinyl esters by ExxonMobil Chemical Company), itaconic acid, crotonic acid, maleic acid, fumaric acid, and ethylene. It is also possible to include $C_4$-$C_8$ conjugated dienes such as 1,3-butadiene, isoprene and chloroprene.

Preferably, the latex monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate.

Additive to an Already Formed Aqueous Latex Dispersion

In another embodiment the above-described biosurfactant can be used as an additive to an already formed aqueous dispersion of latex polymer. This results in an aqueous composition comprising the biosurfactant compound and the latex polymer. The typical monomers from which the latex polymer is formed are described above in the section entitled "Emulsion Polymerization".

For example, the present invention further includes a method of preparing a latex composition or latex polymer dispersion, comprising adding the at least one biosurfactant (emulsifier) as described above to an aqueous dispersion of a latex polymer to produce the latex binder. When the biosurfactant compound is employed as an additive to an already formed aqueous latex dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10,000 ppm of composition). For example, in an embodiment the added amount of biosurfactant is 50-1000 ppm of composition. The biosurfactant may all be added during the formulation or during emulsification, or a portion may be added during emulsification with the remainder added during formulation to arrive at the amount of biosurfactant of the resulting composition.

The at least one pigment and other additives can then be mixed with the resulting latex binder to produce the aqueous coating composition in any appropriate order. The addition of the biosurfactant to the latex polymer forms a mixture having a lower VOC content while maintaining the stability of the mixture at desirable levels.

Additive During Paint or Aqueous Coating Composition Formulation

In another embodiment the above-described biosurfactant can be used as an additive during formulation of paint or aqueous coating composition. Formulation is the stage at which additives are added to a base aqueous latex polymer dispersion to make it into final product such as a paint or coating. For example, pigment is a typical additive added during formulation of paint from raw aqueous latex polymer dispersion. When the biosurfactant compound is added during formulation to a paint or aqueous coating composition, e.g., aqueous latex coating dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10,000 ppm of composition). For example, in an embodiment the added amount of biosurfactant is 50-1000 ppm of composition. In one embodiment, the effective amount of the biosurfactant is less than 1000 ppm, 800 ppm, 500 ppm, 300 ppm, 200 ppm or 100 ppm of composition. In another embodiment, the effective amount of the biosurfactant is less than 100 ppm, or 90 ppm, or 80 ppm, or 70 ppm, or 60 ppm of composition. In yet another embodiment, the effective amount of the biosurfactant is from about 1 ppm to about 60 ppm of composition. In a further embodiment, the effective amount of the biosurfactant is from about 10 ppm to about 50 ppm of composition. In another embodiment, the effective amount of the biosurfactant is from about 20 ppm to about 50 ppm of composition. In yet another embodiment the effective amount of the biosurfactant is from about 25 ppm to about 45 ppm of composition.

The biosurfactant may all be added during the formulation or a portion may be added during emulsification with the remainder added during formulation to arrive at the amount of biosurfactant of the resulting composition.

The present invention further includes a method of preparing a paint or aqueous coating composition, comprising adding the biosurfactant as described above during formulation of paint or aqueous coating composition comprising at least one pigment and other additives to produce the final paint or aqueous coating composition.

Other Additives

As described above, the aqueous coating compositions of the invention include at least one latex polymer derived from at least one latex monomer, for example acrylic monomers and/or the other above-described latex monomers.

The aqueous coating compositions of the invention include less than 2% by weight and preferably less than 1.0% by weight of anti-freeze agents based on the total weight of the aqueous coating composition. For example, the aqueous coating compositions may be substantially free of anti-freeze agents.

The aqueous coating composition typically includes at least one pigment. The term "pigment" as used herein includes non-film-forming solids such as pigments, extenders, and fillers. The at least one pigment is preferably selected from the group consisting of TiO2 (in both anastase and rutile forms), clay (aluminum silicate), CaCO3 (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX (oxides of silicon, aluminum, sodium and potassium commercially available from Unimin Specialty Minerals), CELITES (aluminum oxide and silicon dioxide commercially available from Celite Company), ATOMITES (commercially available from English China Clay International), and ATTAGELS (commercially available from Engelhard). More preferably, the at least one pigment includes TiO2, CaCO3 or clay. Generally, the mean particle sizes of the pigments range from about 0.01 to about 50 microns. For example, the TiO2 particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, additional biocides, additional mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition.

The aqueous coating composition typically includes less than 10% of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating composition includes less than 5.0% or is substantially free (e.g. includes less than 0.1%) of anti-freeze agents. Accordingly, the aqueous coating composition of the invention preferably has a VOC level of less than about 100 g/L and more preferably less than or equal to about 50 g/L.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90%, more preferably, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, additional biocides, additional mildewcides, colorants, waxes, and the like, that do not evaporate upon drying of the coating composition.

In one preferred embodiment of the invention, the aqueous coating composition is a latex paint composition comprising at least one latex polymer derived from at least one acrylic monomer selected from the group consisting of acrylic acid, acrylic acid esters, methacrylic acid, and methacrylic acid esters and at least one polymerizable alkoxylated surfactant; at least one pigment and water. As mentioned above, the at least one latex polymer can be a pure acrylic, a styrene acrylic, a vinyl acrylic or an acrylated ethylene vinyl acetate copolymer.

The present invention further includes a method of preparing an aqueous coating composition by mixing together at least one latex polymer derived from at least one monomer and copolymerized and/or blended with at least one biosurfactant as described above, and at least one pigment. Preferably, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

Most latex emulsions are water based and are prone to microbial attack. Biocides are typically added to the finished latex after all processing is completed to protect the latex from microbial attack. Biocides are substances that kill or inhibit the growth of microorganisms such as bacteria, fungi and algae. These biocides may be selected from one or more members of the group consisting of chlorinated hydrocarbons, organometallics, halogen-releasing compounds, metallic salts, quaternary ammonium compounds, phenolics and organic sulfur compounds. Exemplary of organic sulfur compounds are compounds based on an isothiazolinone (also known as isothiazolothione) structure.

An advantage of the present invention is the use of biosurfactants can reduce the use of potentially less environmentally friendly biocidal chemicals (biocides). For example, the inventor has found combinations of biosurfactants, for example mono-Rhamnolipids, allow for less Isothiazolinone biocides to be utilized in-can.

U.S. Pat. No. 5,373,016 to Brown et al. discloses isothiazolinone biocides. The biocidal activity of these compounds is affected by inactivation of essential enzymes of microbial metabolism which require sulfhydryl groups for activity. These enzymes include phosphoenolpyruvate transphosphorase and a number of dehydrogenases. The thio moiety of the isothiazolinone or isothiazolothione compounds reacts with the free sulfhydryl groups of an enzyme to form a disulfide bond between the enzyme molecule and the isothiazolinone or isothiazolothione molecule rendering the sulfhydryl unavailable for interaction with substrate or effector molecules.

Biocides which are widely used as latex preservatives include PROXEL GXL, having an active ingredient of 1,2-benzisothiazolin-3-one (BIT), PROMEXAL W50, having an active ingredient of 2-methyl-4,5-trimethylene-4-isothiazolin-3-one, and KATHON LX, a blend of 5-chloro-2-methyl-4-isothiazolin-3-one and 2-methyl-4-isothiazolin-3-one active ingredients.

Typical isothiazolinones or isothiazolothiones are represented by the general formula (V):

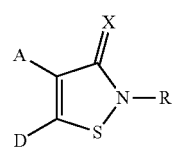

or a salt or a complex thereof;

wherein X is oxygen or sulfur; R is hydrogen, a substituted or unsubstituted hydrocarbyl group, a substituted or unsubstituted hydrocarbylthio group, a substituted or unsubstituted hydrocarbyloxy group or a carbamoyl group; and each of A and D is independently hydrogen, a halogen atom, a cyano group, a substituted or unsubstituted hydrocarbyl group or a direct bond to the other of A or D.

When R, A and D are, or contain, substituted hydrocarbyl groups, the substituents are preferably independently halogen, alkoxy or alkylthio where the alkyl groups contain 1 to 4 carbon atoms. If R is a carbamoyl group, preferably it is of the general type —CON(H)(R$^1$) where R$^1$ is a hydrogen atom or a hydrocarbyl group, which may be substituted with halogen, alkoxy or alkylthio substituents. It is generally preferred that R is a hydrogen atom or a lower alkyl group of 1 to 4 carbon atoms. Most preferably, R is hydrogen or a methyl group.

Preferably, A and D, together with the carbon atoms to which they are attached, form a five- or six-membered substituted or unsubstituted ring. The ring substituents are preferably halogen, alkyl of 1 to 4 carbon atoms, alkoxy of 1 to 4 carbon atoms or alkylthio of 1 to 4 carbon atoms. The ring may contain a heteroatom such as a nitrogen atom replacing a carbon atom. Most preferably, A and D form a hydrocarbon ring such as benzene, cyclopentene or cyclohexene.

Alternatively, A and D are separate groups. Preferably, at least one of A and D is not a hydrogen atom and most preferably, at least one of A and D is a halogen atom or an alkyl group of 1 to 4 carbon atoms.

The biocidal isothiazolinone compounds include 5-chloro-2-methyl-4-isothiazolin-3-one (where R is methyl, A is hydrogen and D is chlorine); 2-methyl-4-isothiazolin-3-one (where R is methyl and A and D are both hydrogen); 4,5-dichloro-2-methylisothiazolin-3-one (where R is methyl and A and D are both chlorine); 2-n-octylisothiazolin-3-one (where R is n-octyl and A and D are both hydrogen; 1,2-benzisothiazolin-3-one (where R is hydrogen and A and D, together with the carbon atoms to which they are attached, form a benzene ring); 4,5-trimethylene-4-isothiazolin-3-one (where R is hydrogen and A and D, together with the carbon atoms to which they are attached, form a cyclopentene ring) and 2-methyl-4,5-trimethylene-4-isothiazolin-3-one (where R is methyl and A and D, together with the carbon atoms to which they are attached, form a cyclopentene ring).

A typical the biocidal compound of this family which may be used as the additional biocidal compound in the present invention is one where R is hydrogen and A and D together form an unsubstituted 5- or 6-membered hydrocarbon ring as in the compounds 1,2-benzisothiazolin-3-one and 4,5-trimethylene-4-isothiazolin-3-one.

Certain of the isothiazolinone or isothiazolothione compounds which may be used as the biocidal compound can have improved solubility in water when in the form of a salt or complex. The salt or complex may be with any suitable cation such as an amine (including an alkanolamine) or a metal. Preferably, any metal salt or complex contains a monovalent metal such as an alkali metal. The alkali metal may be lithium, sodium or potassium. Most preferably, the alkali metal salt is a sodium salt in view of the ready availability of suitable sodium compounds from which to prepare the salt.

Certain isothiazolinone compounds useful as the biocidal compounds decompose in the presence of alkali. Exemplary of alkali-sensitive compounds are 5-chloro-2-methyl-4-isothiazolin-3-one and 2-methyl-4-isothiazolin-3-one. Accordingly, the pH of the compositions of the present invention which are alkali sensitive should be maintained at a value no greater than about 8.

When adding biosurfactant after emulsion, typically, the biosurfactant is added in an amount of 0.1 to 1000 ppm of total composition, preferably 0.1 to 500 ppm, more preferably 0.1 to 100 ppm, more typically 1 to 100 ppm, or 1 to 50 ppm. The isothiazolinone could be present in an amount of 0.5 to 200 ppm, more typically 0.5 to 100 ppm or 1 to 100 ppm, or 0.5 to 25 ppm, total composition.

Typically the weight ratio of the biosurfactant to isothiazolinones is 0.8:1 to 325:1, more typically 20:1 to 35:1.

In particular for treating bacteria the aqueous coating composition further comprises isothiazolinone biocide and typically the weight ratio of biosurfactant to isothiazolinone biocide is 200 to 500:0.3 to 1.

For treating yeast and fungus the aqueous coating composition further comprises isothiazolinone biocide and typically the weight ratio of biosurfactant to isothiazolinone biocide is 200 to 500:5 to 30.

The present invention will now be further described by the following non-limiting examples.

EXAMPLES

In microbiology, minimum inhibitory concentration (MIC) is defined as the lowest concentration of an antimicrobial that will inhibit the growth of an microorganism after overnight or long incubation. Minimum inhibitory concentrations are important in diagnostic laboratories to confirm resistance of microorganisms to an antimicrobial agent and also to monitor the activity of new antimicrobial agents. A lower MIC is an indication of a better antimicrobial agent, as less is generally needed for acceptable performance. An MIC determination is generally regarded as a basic or standard laboratory measurement of the activity of an antimicrobial agent against an organism.

Test Procedures and Protocols
  Biocides tested:
  Methylchloroisothiazolinone/Methylisothiazolinone (CMIT/MIT) [also known as KATHON]:
  Benzisothiazolinone [BIT]
  Methylisothiazolinone [MIT]

3 chloromethyl Isothiazolinone has the formula A

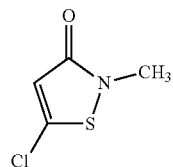

Methyl Isothiazolinone has the formula B

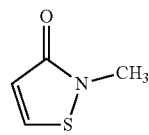

BIT [Benz Isothiazolinone] has the formula C.

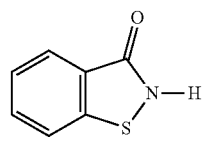

Microorganism Used: *Pseudomonas aeruginosa* ATCC 9027

Biosurfactants tested:
1. R95D90 (SigmaAldrich) 95% pure rhamnolipid with 90% Di-rhamnolipid dominant
2. R95M90 (SigmaAldrich) 95% pure rhamnolipid with 90% Mono-rhamnolipid dominant
3. Natural Saponin MIC test is a method for determining the Minimum Inhibitory Concentration of a compound required to inhibit or kill the test organisms. MIC50 test is a method for determining the Minimum Inhibitory Concentration of a compound required to inhibit or kill the 50% of the test organisms.

Detailed Procedure
1. The method was based on the MIC (Minimum Inhibitory Concentration) determination by standard two fold dilutions prepared in an appropriate medium and tested in 96 well microtiter plates.
2. A 4× concentration of the active from bio-surfactant stock solution [400 ppm] was prepared to dispense into columns 4-6.
3. The plates were divided into four sections. Unless otherwise stated, Columns 1-3 received a combination of the bio-surfactant and biocide, Columns 4-6 received biocide alone, and Columns 7-9 received the bio-surfactant alone. Column 10 was left empty, Column 11 was blank medium and Column 12 was medium plus the suspension of the organism.
5. One microtiter plate per test organism and per biocide was used. The dilution scheme is attached as a separate PDF file "Dilution Scheme".
6. 100 µL of sterile water was aliquoted into to columns 4-6, 11 and 12 with the aid of a 12-channel pipettor add 50 µL in Columns 1-3 and 7-9.

7. Dispensed 50 μL of the 8× stock solution of an appropriate biocide (MIT, BIT or Kathon) in Row A Columns 1-3

8. After mixing with the aid of the multichannel pipettor, 50 μL from the row A wells were transferred to 2nd row [B] wells and after mixing, 50 μL transferred to row C and, the operations were repeated down to row G and 50 μL from H row (the last row) were discarded.

9. Make 4× stock solution [400 ppm] of each of the bio-surfactants. Dispensed 50 μL of bio-surfactant in 4 different 96 well plates in Columns 7-9 in each of the respective plates.

10. In wells 4-6, 100 μL of individual biocides at 4× concentration were added to the top row A, then serially diluted down to row H while discarding the final 100 μL from row H.

11. Columns 1-3 and 7-9 received 50 μL of 4× bio-surfactant.

12. In a separate tube, prepared bacterial inoculums from 24 hr grown cultures by suspending the cells in 2× Tryptic Soy Broth medium for bacteria.

13. The bacterial inocula were adjusted to 5-6 logs cfu/ml by measuring the turbidity.

14. With an aid of the multichannel pipettor, aliquots of 100 μL organisms were dispensed into each well except for Column 11 in which blank medium was added.

15. Incubated the plates at 35 Celsius degrees for 24 hours for bacterial growth 16. Made visual recordings of positive or negative growth in wells. Measured the absorbance at 660 nm and assessed viability via addition of resazurin dye. Note: for bacterial growth, 10 μL of dye Resazurin stock [250 mg/50 mL] was added to determine the positive and negative growths as determined by color change from blue to pink. MIC was determined as the lowest concentration of biocide at which no growth was observed. The turbidity measurements were averaged for each concentration range and MIC50 was determined for each biocide with and without the test biosurfactant.

Results:

Commercially available mono-rhamnolipids, at a 50 ppm active level, we was effective at lowering the MIC50 values of all 3 biocides tested which included MIT, BIT and Kathon.

Figure 2:
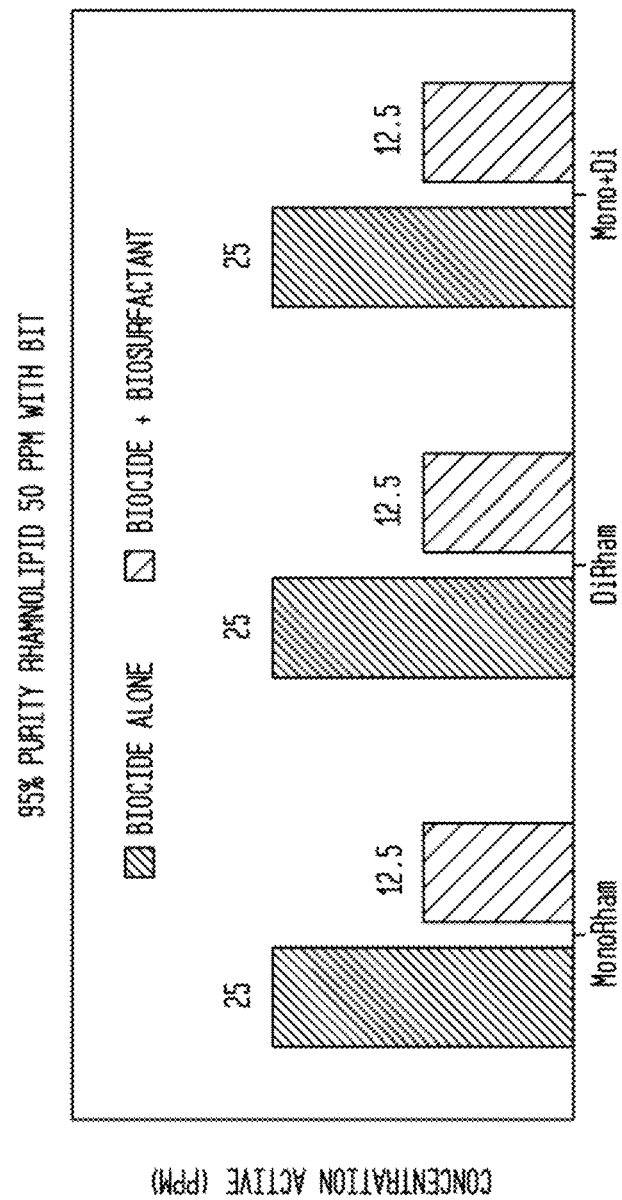
FIG. 2 shows the results of 95% purity rhamnolipd 50 ppm with BIT.
Figure 3:
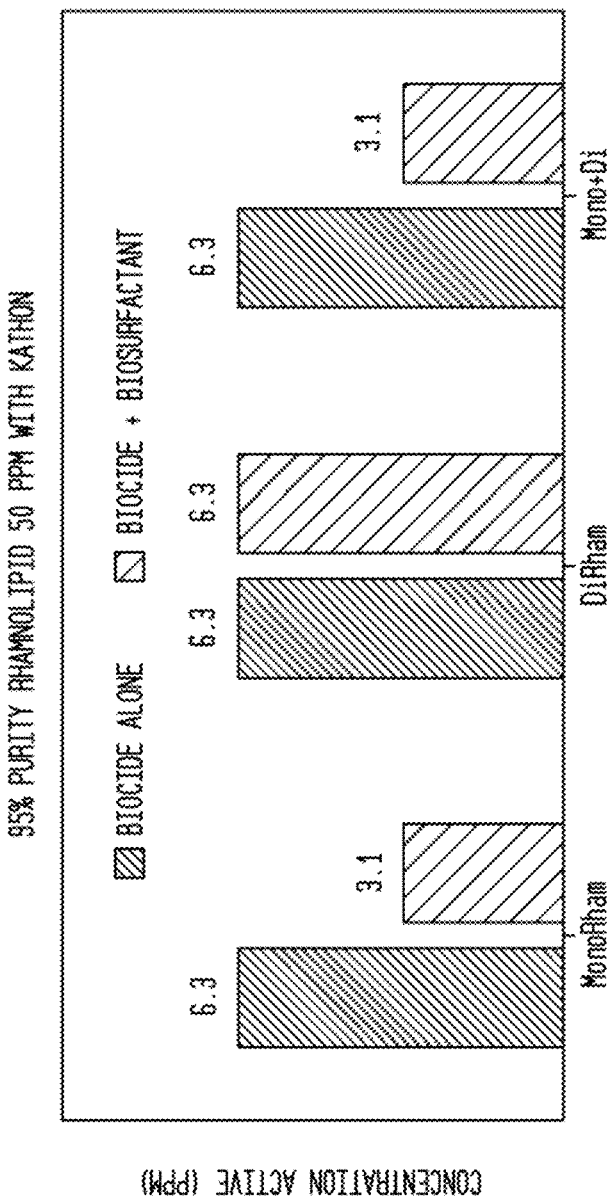
FIG. 3 shows the results of 95% purity rhamnolipid 50 ppm with Kathon.

As seen in Table 1, as well as FIGS. 1-3, the 95% research grade mono-rhamnolipid dominant biosurfactant (R95M90) alone at 50 ppm was also effective at reducing the MIC values in all three biocides tested. On the other hand, purified di-rhamnolipid dominant (R95D90) version was able to lower the concentration of the BIT biocide only.

TABLE 1

Testing of R95M90, R95D90, Natural Saponin

| | Agae Technology (Sigma Aldrich) | | | | | | | |
|---|---|---|---|---|---|---|---|---|
| | Mono-Rhamnolipid 95% (50 ppm) | | Di-Rhamnolipid 95% (50 ppm) | | Mono + Di Rhamnolipid 95% (50 ppm) | | Natural Saponin (Purchased) | |
| Biocide | w/o BS | with BS | w/o BS | with BS | w/o BS | with BS | w/o BS | with BS |
| BIT | 25 | 12.5 | 25 | 12.5 | 25 | 12.5 | 25 | >200 |
| MIT | 12.5 | 6.5 | 12.5 | 12.5 | 12.5 | 6.5 | 12.5 | >100 |
| CMIT/MIT | 6.25 | 3.25 | 6.25 | 6.25 | 6.25 | 3.25 | 6.25 | >25 |

The adjuvant efficacy was restored by mixing the purified di-monorhamnolipid and mono-rhamnolipid dominants together (R95M90+R95D90) in equal parts, suggesting that the adjuvant property of the rhamnolipid biosurfactant is primarily due to the activity of mono-rhamnolipid congeners.

All bio-surfactants were tested at final concentration of 50 ppm active. The term "BS" stands for "bio-surfactant". Each data point is a MIC value (in ppm) tested against *Pseudomonas aeruginosa*. Mono-rhamnolipid component alone appears to be sufficient.

TABLE 2

Figure 4:
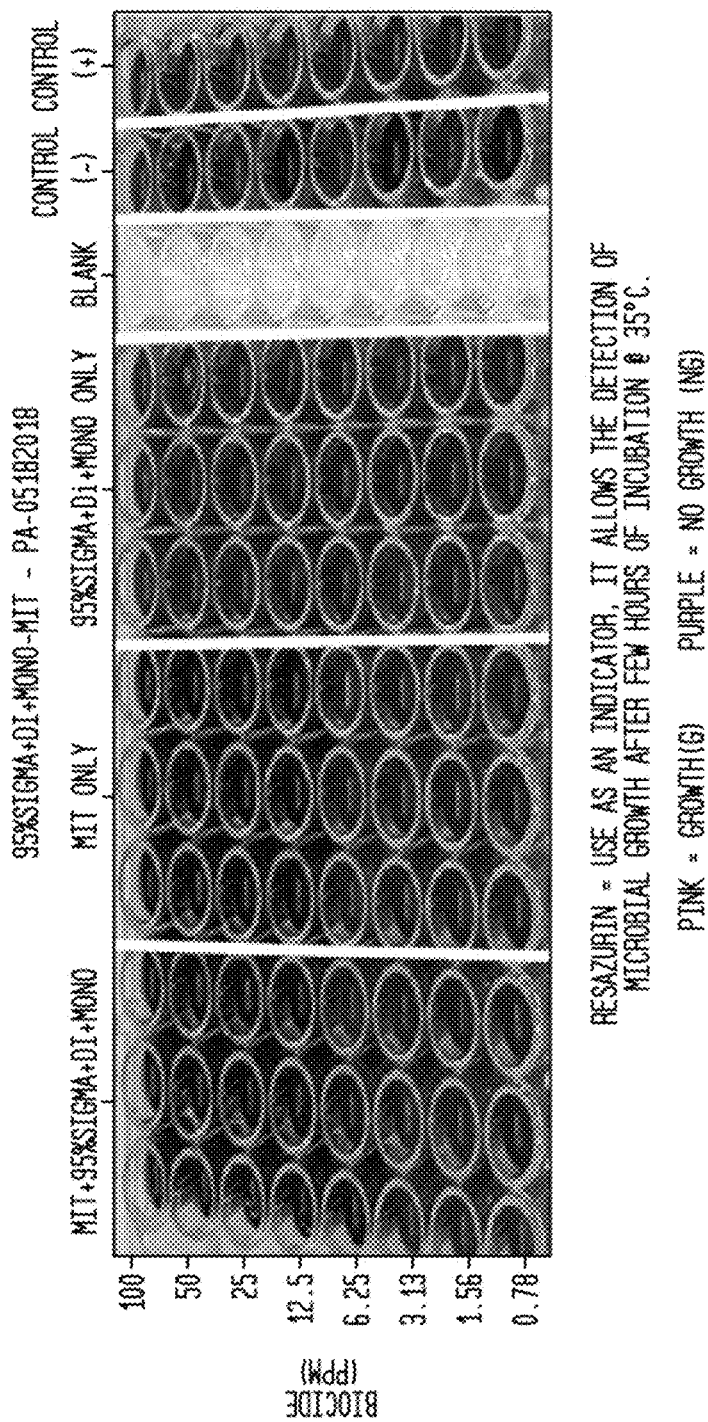
FIG. 4 shows the microbial growth after a few hours for 95% sigma+DI+Mono-MIT.

Refers to FIG. 4

| PPM | MIT + 95% Sigma + DI + Mono | | | CMIT/MIT Only | | | 95% Sigma + Di + Mono Only | | | Blank | Control (−) | Control (+) |
|---|---|---|---|---|---|---|---|---|---|---|---|---|
| 100 | 0.048 | 0.047 | 0.047 | 0.049 | 0.049 | 0.054 | 0.716 | 0.941 | 0.857 | 0.044 | 1.205 | 1.46 |
| 50 | 0.047 | 0.046 | 0.046 | 0.045 | 0.047 | 0.047 | 1.095 | 1.196 | 1.098 | 0.043 | 0.046 | 1.399 |
| 25 | 0.046 | 0.048 | 0.047 | 0.047 | 0.05 | 0.067 | 1.247 | 1.297 | 1.339 | 0.043 | 1.143 | 1.426 |
| 12.5 | 0.047 | 0.051 | 0.055 | 0.048 | 0.048 | 0.045 | 1.32 | 1.286 | 1.25 | 0.045 | 0.047 | 1.472 |
| 6.25 | 0.055 | 0.206 | 0.47 | 1.248 | 1.259 | 1.162 | 1.405 | 1.385 | 1.352 | 0.044 | 1.166 | 1.488 |
| 3.13 | 0.619 | 0.817 | 0.57 | 1.365 | 1.33 | 1.316 | 1.398 | 1.385 | 1.423 | 0.044 | 0.047 | 1.501 |
| 1.56 | 0.801 | 0.696 | 0.735 | 1.298 | 1.313 | 1.291 | 1.396 | 1.374 | 1.369 | 0.042 | 1.258 | 1.503 |
| 0.78 | 0.789 | 0.622 | 0.727 | 1.288 | 1.415 | 1.352 | 1.47 | 1.374 | 1.361 | 0.044 | 0.045 | 1.456 |

TABLE 3

Figure 5:
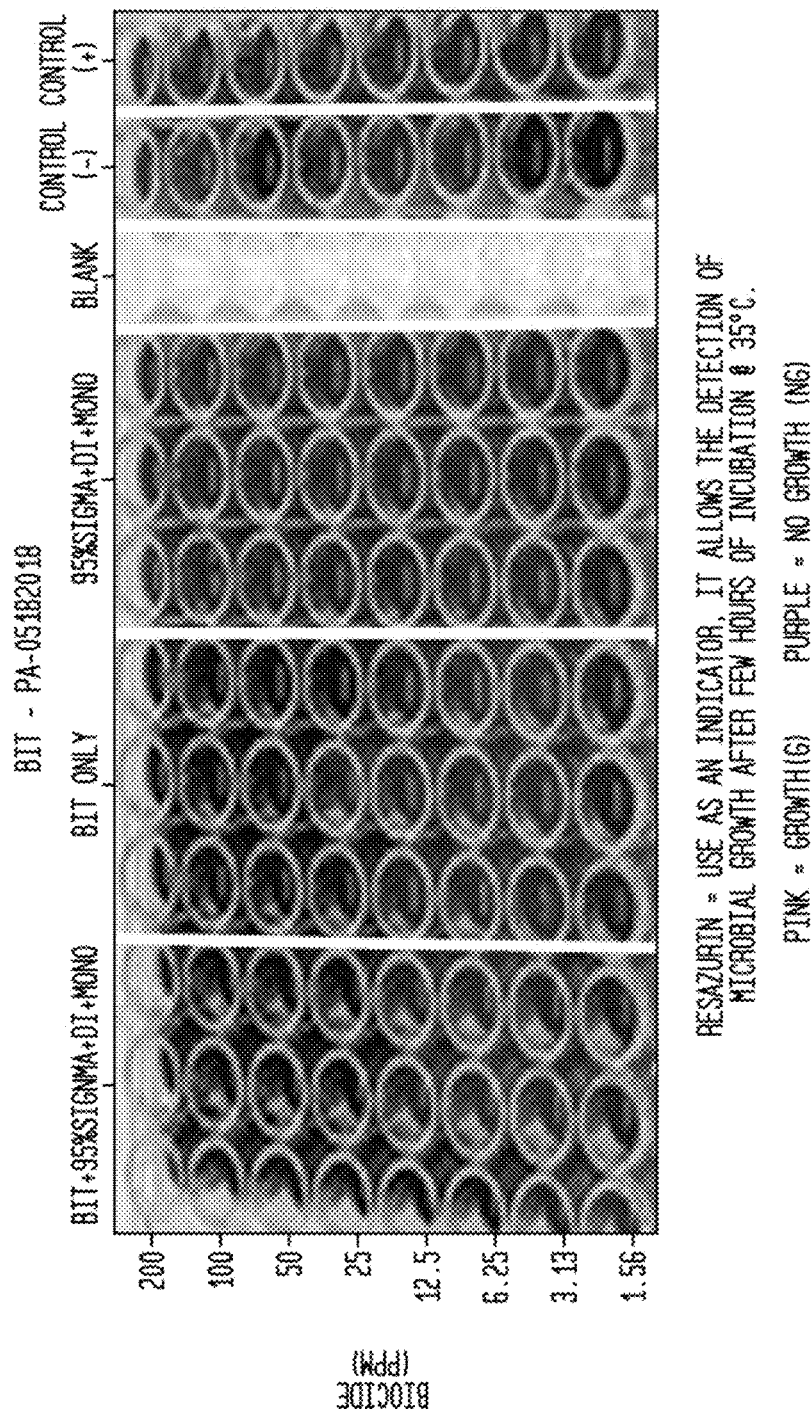
FIG. 5 shows the microbial growth after a few hours for 95% sigma+DI+Mono-BTI.

Refers to FIG. 5

| PPM | BIT + 95% Sigma + DI + Mono | | | BIT Only | | | 95% Sigma + Di + Mono | | | Blank | Control (−) | Control (+) |
|---|---|---|---|---|---|---|---|---|---|---|---|---|
| 200 | 1.299 | 1.443 | 1.439 | 1.371 | 1.379 | 1.371 | 1.388 | 1.382 | 1.382 | 0.044 | 0.047 | 1.368 |
| 100 | 1.312 | 1.398 | 1.371 | 1.339 | 1.313 | 1.302 | 1.408 | 1.42 | 1.423 | 0.043 | 0.045 | 1.36 |
| 50 | 0.115 | 1.297 | 1.305 | 1.278 | 1.284 | 1.285 | 1.425 | 1.424 | 1.417 | 0.043 | 1.44 | 1.375 |
| 25 | 0.046 | 0.737 | 0.438 | 1.132 | 1.103 | 0.265 | 1.363 | 1.423 | 1.439 | 0.044 | 1.101 | 1.375 |
| 12.5 | 0.046 | 0.048 | 0.049 | 0.14 | 0.64 | 0.044 | 1.277 | 1.3 | 1.346 | 0.044 | 1.218 | 1.37 |
| 6.25 | 0.046 | 0.048 | 0.051 | 0.047 | 0.047 | 0.048 | 1.375 | 1.366 | 1.348 | 0.044 | 0.046 | 1.394 |
| 3.13 | 0.048 | 0.048 | 0.05 | 0.046 | 0.047 | 0.048 | 1.139 | 1.148 | 1.075 | 0.042 | 1.128 | 1.384 |
| 1.56 | 0.046 | 0.047 | 0.047 | 0.046 | 0.048 | 0.047 | 0.575 | 0.295 | 0.371 | 0.044 | 1.224 | 1.389 |

TABLE 4

Figure 6:
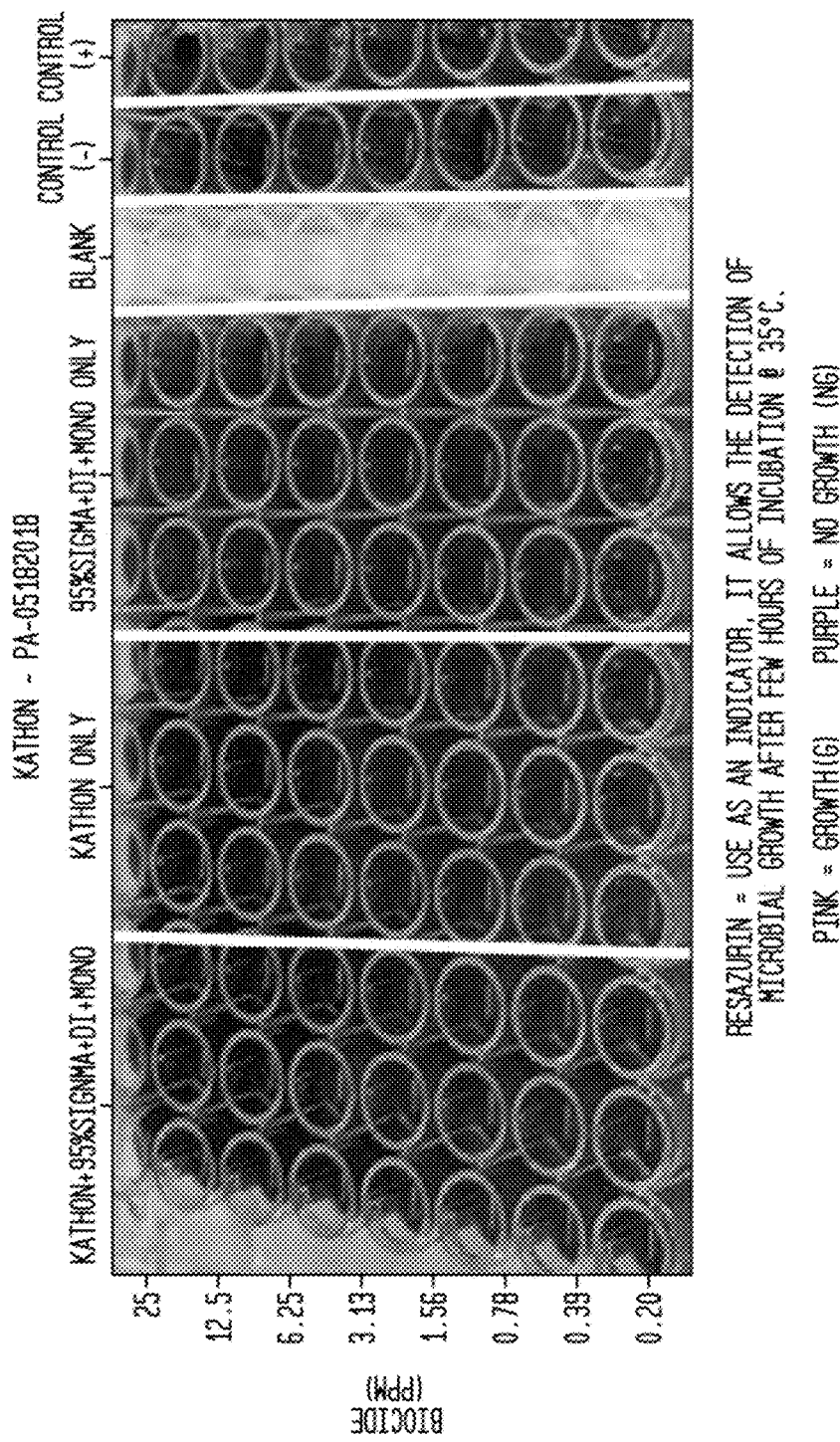
FIG. 6 shows the microbial growth after a few hours for 95% sigma+DI+Mono-Kathon.

Refers to FIG. 6

| PPM | KATHON + 95% Sigma + DI + Mono | | | KATHON Only | | | 95% Sigma + DI + Mono Only | | | Blank | Control (−) | Control (+) |
|---|---|---|---|---|---|---|---|---|---|---|---|---|
| 25 | 0.613 | 0.757 | 0.739 | 1.43 | 1.392 | 1.407 | 1.377 | 1.378 | 1.347 | 0.044 | 1.068 | 1.415 |
| 12.5 | 0.826 | 0.877 | 0.962 | 1.389 | 1.447 | 1.461 | 1.342 | 1.399 | 1.361 | 0.036 | 1.151 | 1.352 |
| 6.25 | 0.813 | 0.882 | 0.94 | 1.326 | 1.316 | 1.42 | 1.353 | 1.411 | 1.417 | 0.037 | 0.046 | 1.377 |
| 3.13 | 0.904 | 1.06 | 0.961 | 1.35 | 1.413 | 1.346 | 1.324 | 1.369 | 1.392 | 0.039 | 1.157 | 1.357 |
| 1.56 | 0.053 | 0.832 | 0.049 | 0.933 | 0.574 | 0.045 | 1.279 | 1.248 | 1.313 | 0.038 | 1.131 | 1.346 |
| 0.78 | 0.047 | 0.048 | 0.048 | 0.495 | 0.048 | 0.048 | 1.331 | 1.369 | 1.37 | 0.036 | 0.047 | 1.348 |
| 0.39 | 0.049 | 0.048 | 0.047 | 0.047 | 0.051 | 0.048 | 1.067 | 1.117 | 1.06 | 0.045 | 0.046 | 1.354 |
| 0.20 | 0.047 | 0.047 | 0.047 | 0.046 | 0.048 | 0.047 | 0.58 | 0.572 | 0.503 | 0.044 | 1.168 | 1.398 |

In the above detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. It is understood that upon reading the above description of the present invention, one skilled in the art could make changes and variations therefrom. These changes and variations are included in the spirit and scope of the following appended claims.

What is claimed is:

1. An aqueous coating composition, comprising a dispersion comprising
   (a) at least one latex polymer;
   (b) a biocide;
   (c) a biosurfactant comprising a mono-rhamnolipid in an amount effective to reduce the necessary biocide concentration in the coating composition compared to an analogous composition that lacks the biosurfactant; and
   (d) water,
wherein the biosurfactant further comprises a di-rhamnolipid, and wherein the wt % ratio of mono-rhamnolipid to di-rhamnolipid is in the range of between about 50:50 and 99.9:0.1, respectively.

2. The composition of claim 1, wherein the wt % ratio of mono-rhamnolipid to di-rhamnolipid is in the range of between about 90:10 and 99:1, respectively.

3. The composition of claim 1, wherein the wt % ratio of mono-rhamnolipid to di-rhamnolipid is in the range of between about 85:15 and 99.5:0.5, respectively.

4. The composition of claim 1, wherein the wt % ratio of mono-rhamnolipid to di-rhamnolipid is in the range of between about 80:20 and 99.9:0.1, respectively.

5. The composition of claim 1, wherein the effective amount of the biosurfactant is less than 5000 ppm of composition.

6. The composition of claim 1, wherein the effective amount of the biosurfactant is less than 60 ppm of composition.

7. The composition of claim 1, wherein the effective amount of the biosurfactant is from about 1 ppm to about 60 ppm of composition.

8. The composition of claim 1, wherein the effective amount of the biosurfactant is from about 10 ppm to about 50 ppm of composition.

9. The composition of claim 1, wherein the effective amount of the biosurfactant is from about 20 ppm to about 50 ppm of composition.

10. The composition of claim 1, wherein the effective amount of the biosurfactant is from about 25 ppm to about 45 ppm of composition.

11. The composition according to claim 1, wherein said at least one biocide comprises an isothiazolinone biocide.

12. The composition of claim 1, further comprising at least one pigment and wherein the latex polymer comprises at least one acrylic monomeric unit.

13. The composition according to claim 12, wherein the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and $C_4$-$C_8$ conjugated dienes.

14. A process for using a biosurfactant for polymerization, comprising the step of emulsion polymerizing a reaction mixture to prepare a latex polymer, said reaction mixture comprising at least one monomer and at least one biosurfactant comprising a mono-rhamnolipid, wherein the biosurfactant further comprises a di-rhamnolipid, and wherein the wt % ratio of mono-rhamnolipid to di-rhamnolipid is in the range of between about 50:50 and 99.9:0.1, respectively.

15. The process according to claim 14, wherein the emulsion polymerizing comprises: forming a stable aqueous pre-emulsion from the at least one monomer and the biosurfactant, and forming said reaction mixture comprising the pre-emulsion, an initiator, and water.

16. The process according to claim 14, wherein the emulsion polymerizing comprises: forming an initiator solution comprising the initiator;
forming a stable aqueous stable pre-emulsion comprising the at least one monomer and the biosurfactant; adding the initiator solution to a reactor; and
adding the pre-emulsion to the reactor to form the reaction mixture.

17. The process according to claim 14, further comprising at least one pigment.

18. The process according to claim 17, wherein the at least one pigment includes at least one pigment selected from the group consisting of $TiO_2$, clay, $CaCO_3$, aluminum oxide, silicon dioxide, magnesium oxide, talc (magnesium silicate), barytes (barium sulfate), zinc oxide, zinc sulfite, sodium oxide, potassium oxide and mixtures thereof.

19. The process according to claim 14, wherein the latex polymer is derived from at least one acrylic monomer selected from the group consisting of acrylic acid, acrylic acid esters, methacrylic acid, and methacrylic acid esters.

20. The process according to claim 14, wherein the monomer comprises at least one first monomer selected from the group consisting of acrylic acid, acrylic acid esters, methacrylic acid, methacrylic acid esters, styrene, vinyl toluene, vinyl acetate, vinyl versatate, acrylonitrile, acrylamide, butadiene, ethylene, vinyl chloride and mixtures thereof.

21. The process according to claim 14, wherein the at least one latex polymer is selected from the group consisting of pure acrylics, styrene acrylics, vinyl acrylics, acrylated ethylene vinyl acetate copolymers, and a butyl acrylate/methyl methacrylate copolymer.

22. The process according to claim 14, comprising
forming a stable aqueous pre-emulsion from said at least one first monomer, at least one second monomer and the biosurfactant, and
forming said reaction mixture comprising the pre-emulsion, an initiator, and water,
wherein said at least one first monomer is at least one acrylic monomer selected from the group consisting of acrylic acid, acrylic acid esters, methacrylic acid, and methacrylic acid esters, and
wherein the at least one second monomer is selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

23. The process of claim 22, wherein the initiator is selected from the group consisting of ammonium persulfate, hydrogen peroxide, sodium, potassium, ammonium peroxydisulfate, dibenzoyl peroxide, lauryl peroxide, ditertiary butyl peroxide, 2,2'-azobisisobutyronitrile, t-butyl hydroperoxide, benzoyl peroxide, and mixtures thereof.

24. The process of claim 22, wherein the pre-emulsion is made of 0.001 to 10% by weight of the biosurfactant with respect to the total weight of aqueous pre-emulsion.

25. The process of claim 22, wherein the aqueous coating composition comprises 0.5 to 10 parts by weight surfactant per 100 parts monomers used to form the latex polymer, wherein the surfactant is an emulsifier blend comprising (i) said biosurfactant and (ii) at least one non-ionic surfactant or anionic surfactant, wherein the aqueous pre-emulsion comprises sufficient emulsifier blend to stabilize the aqueous pre-emulsion.

26. The process of claim 25, wherein at least 5 wt % of the emulsifier blend is said biosurfactant.

27. The process according to claim 22, further comprising adding an isothiazolinone and/or isothiazolothione biocide to the emulsion after polymerization.

28. The process of claim 22, wherein the emulsion polymerizing comprises the following sequential steps:
a) forming a stable aqueous pre-emulsion from a monomer and the biosurfactant,
b) forming said reaction mixture comprising the pre-emulsion, an initiator, and water
c) introducing the reaction mixture into a reactor and adding from 1 to 10% by weight of said pre-emulsion into said reaction mixture, and
d) heating said reaction mixture obtained at the end of step c) to a temperature of between 40° C. and 90° C. to generate a seed formed of latex particles in dispersion in the water.

29. A method of preparing an aqueous coating composition, comprising contacting at least one latex polymer aqueous dispersion comprising at least one biosurfactant with at least one biocide, wherein the biosurfactant comprises a mono-rhamnolipid in an amount effective to reduce the necessary biocide concentration in the coating composition compared to an analogous composition that lacks the biosurfactant, wherein the biosurfactant further comprises a di-rhamnolipid, and wherein the wt % ratio of mono-rhamnolipid to di-rhamnolipid is in the range of between about 50:50 and 99.9:0.1, respectively.

30. The method according to claim 29, wherein the at least one latex polymer includes at least one member selected from the group consisting of pure acrylics, styrene acrylics, vinyl acrylics and acrylated ethylene vinyl acetate copolymers.

31. The method according to claim 29, wherein the at least one latex polymer is derived from at least one monomer selected from the group consisting of acrylic acid, acrylic acid esters, methacrylic acid, and methacrylic acid esters, styrene, vinyl toluene, vinyl versatate, acrylonitrile, acrylamide, butadiene, ethylene, vinyl chloride and mixtures thereof.

32. The method according to claim 29, further comprises adding at least one additive selected from the group consisting of dispersants, surfactants, rheology modifiers, defoamers, thickeners, additional biocides, colorants, waxes, perfumes and co-solvents to a mixture comprising the latex polymer and water.

33. The method according to claim 29, further comprising adding at least one pigment.

34. The method of claim 29, wherein the effective amount of the mono-rhamnolipid reduces the necessary biocide concentration in the coating composition in an amount greater than 20% as compared to an analogous composition that lacks the biosurfactant.

35. The method of claim 29, wherein the effective amount of the mono-rhamnolipid reduces the necessary biocide concentration in the coating composition in an amount greater than 60% as compared to an analogous composition that lacks the biosurfactant.

36. The method of claim 29, wherein the wt % ratio of mono-rhamnolipid to di-rhamnolipid is in the range of between about 90:10 and 99:1, respectively.

37. The method of claim 29, wherein the wt % ratio of mono-rhamnolipid to di-rhamnolipid is in the range of between about 85:15 and 99.5:0.5, respectively.

38. The method of claim 29, wherein the wt % ratio of mono-rhamnolipid to di-rhamnolipid is in the range of between about 80:20 and 99.9:0.1, respectively.

39. The method of claim 29, wherein the effective amount of the biosurfactant is less than 5000 ppm of composition.

40. The method of claim 29, wherein the effective amount of the biosurfactant is less than 60 ppm of composition.

41. The method of claim 29, wherein the effective amount of the biosurfactant is from about 1 ppm to about 60 ppm of composition.

42. The method of claim 29, wherein the effective amount of the biosurfactant is from about 10 ppm to about 50 ppm of composition.

43. The composition of claim 1, wherein the effective amount of the mono-rhamnolipid reduces the necessary biocide concentration in the coating composition in an amount greater than 20% as compared to an analogous composition that lacks the biosurfactant.

44. The composition of claim 1, wherein the effective amount of the mono-rhamnolipid reduces the necessary biocide concentration in the coating composition in an amount greater than 60% as compared to an analogous composition that lacks the biosurfactant.

* * * * *